US012605932B2

(12) United States Patent
Mizuta et al.

(10) Patent No.: US 12,605,932 B2
(45) Date of Patent: Apr. 21, 2026

(54) LIQUID DISCHARGE HEAD, LIQUID DISCHARGE APPARATUS, AND NOZZLE SUBSTRATE

(71) Applicant: SEIKO EPSON CORPORATION, Tokyo (JP)

(72) Inventors: Shohei Mizuta, Matsumoto (JP); Akira Miyagishi, Shiojiri (JP); Toshiro Murayama, Fujimi (JP); Madoka Ito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 214 days.

(21) Appl. No.: 18/347,936

(22) Filed: Jul. 6, 2023

(65) Prior Publication Data

US 2024/0010000 A1 Jan. 11, 2024

(30) Foreign Application Priority Data

Jul. 7, 2022 (JP) ................................. 2022-109405

(51) Int. Cl.
*B41J 2/14* (2006.01)
*B41J 2/045* (2006.01)
*B41J 2/01* (2006.01)

(52) U.S. Cl.
CPC ......... *B41J 2/1433* (2013.01); *B41J 2/04541* (2013.01); *B41J 2/04581* (2013.01); *B41J 2002/012* (2013.01)

(58) Field of Classification Search
CPC ........................................................ B41J 2/145
See application file for complete search history.

(56) References Cited

U.S. PATENT DOCUMENTS

2018/0001641 A1* 1/2018 Fukuda .................. B41J 2/1433
2018/0170049 A1* 6/2018 Taniuchi .................. B41J 2/145
2020/0290356 A1* 9/2020 Kushima .............. B41M 7/0018

FOREIGN PATENT DOCUMENTS

JP 2007030242 A * 2/2007
JP 2011-046061 A 3/2011

* cited by examiner

*Primary Examiner* — Shelby L Fidler
(74) *Attorney, Agent, or Firm* — Harness, Dickey & Pierce, P.L.C.

(57) ABSTRACT

A liquid discharge head includes a first nozzle and a second nozzle, the first nozzle includes a first downstream nozzle portion opened on a discharge surface of a nozzle substrate and a first upstream nozzle portion of which a cross-sectional area is larger than a cross-sectional area of the first downstream nozzle portion, the second nozzle includes a second downstream nozzle portion opened on the discharge surface and a second upstream nozzle portion of which a cross-sectional area is larger than a cross-sectional area of the second downstream nozzle portion, and, when viewed in a thickness direction, a second distance between a gravity center position of the second downstream nozzle portion and a gravity center position of the second upstream nozzle portion is longer than a first distance between a gravity center position of the first downstream nozzle portion and a gravity center position of the first upstream nozzle portion.

16 Claims, 13 Drawing Sheets

| NOZZLE | ANGLE | |
|---|---|---|
| 1 | θA1 | AI[1] |
| 2 | θA2 | AI[2] |
| ... | ... | |
| (M+1)/2 | 0 | AI[(M+1)/2] |
| ... | ... | |
| M-1 | θA2 | AI[M-1] |
| M | θA1 | AI[M] |

FIG. 16

T1 TP1 TP2 TP3

| MAGNITUDE OF DEVIATION OF COAXIALITY [μm] \ LENGTH OF Pwh1 | 8 [μs] | 10 [μs] | 12 [μs] |
|---|---|---|---|
| −6 [μm] | θP1 | θP2 | θP3 |
| −8 [μm] | −13 [deg] | −7 [deg] | −1 [deg] |
| −10 [μm] | θP4 | θP5 | θP6 |

FIG. 18

T2

| | | Vc1,Vc2 | | | |
|---|---|---|---|---|---|
| | | 10%,60% | 14%,79% | 18%,100% | |
| MAGNITUDE OF DEVIATION OF COAXIALITY [μm] | −6 [μm] | θV1 | θV2 | θV3 | TV1 |
| | −8 [μm] | 2.8 [deg] | 0.4 [deg] | 0 [deg] | TV2 |
| | −10 [μm] | θV4 | θV5 | θV6 | TV3 |

LIQUID DISCHARGE HEAD, LIQUID DISCHARGE APPARATUS, AND NOZZLE SUBSTRATE

The present application is based on, and claims priority from JP Application Serial Number 2022-109405, filed Jul. 7, 2022, the disclosure of which is hereby incorporated by reference herein in its entirety.

BACKGROUND

1. Technical Field

The present disclosure relates to a liquid discharge head, a liquid discharge apparatus, and a nozzle substrate.

2. Related Art

In related art, a liquid discharge head that has a nozzle substrate having a plurality of nozzles which discharge liquid such as ink and forms an image on a medium by discharging the liquid from the nozzle onto the medium, is known. When the liquid is discharged from the plurality of nozzles and at the same time, the position between the liquid discharge head and the medium moves relatively, an air flow may be generated, and the generated air flow may affect a discharge direction of the liquid. When the discharge direction of the liquid is deviated from a direction perpendicular to the discharge surface of the nozzle substrate due to the air flow, a position at which the liquid lands on the medium is deviated from an ideal landing position. When the position at which the liquid lands on the medium is deviated from the ideal landing position, the quality of an image formed on the medium decreases.

For example, JP-A-2011-46061 discloses a liquid discharge apparatus in which a plurality of types of liquid are classified into two or more groups that are not used at the same time, and the liquid belonging to different groups in adjacent nozzle rows is alternately discharged, so that the interval between the nozzle rows that discharge the liquid at the same time is widened, and the influence of an air flow can be reduced.

However, when the liquid belonging to different groups is alternately discharged as in the related art described above, the influence of the air flow can be reduced, but as compared with an aspect in which the liquid belonging to different groups is discharged at the same time, the period required for forming an image may be extended and the productivity may decrease. In view of these points, the present disclosure provides a liquid discharge head, a liquid discharge apparatus, and a nozzle substrate capable of landing liquid discharged from a nozzle at an appropriate position by means different from those in related art.

SUMMARY

According to a preferred aspect of the present disclosure, a liquid discharge head includes a first driving element, a second driving element, a first pressure chamber that is partitioned on a pressure chamber substrate and imparts pressure to liquid by driving the first driving element, a second pressure chamber that is partitioned on the pressure chamber substrate and imparts pressure to liquid by driving the second driving element, a first nozzle that is one of a plurality of nozzles included in a nozzle row formed on a nozzle substrate and communicates with the first pressure chamber, and a second nozzle that is one of the plurality of nozzles and communicates with the second pressure chamber, in which the first nozzle is positioned closer to a center of the nozzle row than the second nozzle, the second nozzle is positioned closer to an end of the nozzle row than the first nozzle, the nozzle substrate has a discharge surface positioned opposite to the pressure chamber substrate, the first nozzle includes a first downstream nozzle portion opened on the discharge surface and a first upstream nozzle portion of which a cross-sectional area is larger than a cross-sectional area of the first downstream nozzle portion when viewed in a thickness direction of the nozzle substrate and that is positioned upstream of the first downstream nozzle portion, the second nozzle includes a second downstream nozzle portion opened on the discharge surface and a second upstream nozzle portion of which a cross-sectional area is larger than a cross-sectional area of the second downstream nozzle portion when viewed in the thickness direction and that is positioned upstream of the second downstream nozzle portion, and in a case where, when viewed in the thickness direction, a distance between a gravity center position of the first downstream nozzle portion and a gravity center position of the first upstream nozzle portion is set as a first distance, and, when viewed in the thickness direction, a distance between a gravity center position of the second downstream nozzle portion and a gravity center position of the second upstream nozzle portion is set as a second distance, the second distance is longer than the first distance.

According to another preferred aspect of the present disclosure, a liquid discharge apparatus includes a liquid discharge head, and a movement mechanism that changes a relative position between a medium in which an image is formed by landing of liquid discharged from the liquid discharge head or an intermediate transfer body, on which the liquid discharged from the liquid discharge head lands, that transfers an image formed by landing of the liquid onto the medium, and the liquid discharge head, in which a distance between the second nozzle and the medium or the intermediate transfer body in the thickness direction is longer than a distance between the first nozzle and the medium or the intermediate transfer body in the thickness direction.

According to still another preferred aspect of the present disclosure, a nozzle substrate having a nozzle row constituted with a plurality of nozzles from which liquid is discharged, includes a first nozzle that is one of the plurality of nozzles and a second nozzle that is one of the plurality of nozzles, in which the first nozzle includes a first downstream nozzle portion opened on a discharge surface of the nozzle substrate and a first upstream nozzle portion of which a cross-sectional area is larger than a cross-sectional area of the first downstream nozzle portion when viewed in a thickness direction of the nozzle substrate and that is positioned upstream of the first downstream nozzle portion, the second nozzle includes a second downstream nozzle portion opened on the discharge surface and a second upstream nozzle portion of which a cross-sectional area is larger than a cross-sectional area of the second downstream nozzle portion when viewed in the thickness direction and that is positioned upstream of the second downstream nozzle portion, the first nozzle is positioned closer to a center of the nozzle row than the second nozzle, the second nozzle is positioned closer to an end of the nozzle row than the first nozzle, and in a case where, when viewed in the thickness direction, a distance between a gravity center position of the first downstream nozzle portion and a gravity center position of the first upstream nozzle portion is set as a first distance, and, when viewed in the thickness direction, a distance between a gravity center position of the second downstream nozzle portion and a gravity center position of the second upstream nozzle portion is set as a second distance, the second distance is longer than the first distance.

BRIEF DESCRIPTION OF THE DRAWINGS

FIG. 16 is a table illustrating an example of contents of a holding period characteristic table.

FIG. 18 is a table illustrating an example of contents of a holding potential characteristic table.

DESCRIPTION OF EXEMPLARY EMBODIMENTS

Hereinafter, embodiments for carrying out the present disclosure will be described with reference to the drawings. However, in each drawing, the dimensions and scales of each part are appropriately different from the actual ones. Further, since the embodiments described below are suitable specific examples of the present disclosure, various technically preferable limitations are given, but the scope of the present disclosure is not limited to these forms unless there is a description to the effect that the present disclosure is particularly limited in the following description.

In the following description, for convenience, an X-axis, a Y-axis, and a Z-axis that intersect with each other will be appropriately used. Further, one direction along the X-axis is an X1 direction, and the direction opposite to the X1 direction is an X2 direction. Similarly, directions opposite to each other along the Y-axis are a Y1 direction and a Y2 direction. Further, directions opposite to each other along the Z-axis are the Z1 direction and the Z2 direction.

Here, typically, the Z-axis is a vertical axis, and the Z2 direction corresponds to a downward direction in the vertical direction. In other words, the Z2 direction is the gravity direction. However, the Z-axis does not have to be a vertical axis and may be inclined with respect to the vertical axis. Further, the X-axis, the Y-axis, and the Z-axis are typically orthogonal to each other, but the present disclosure is not limited thereto, and for example, the X-axis, the Y-axis, and the Z-axis may intersect at an angle within a range of 80 degrees or more and 100 degrees or less.

1. First Embodiment

1-1. Outline of Liquid Discharge Apparatus 100

Figure 1:
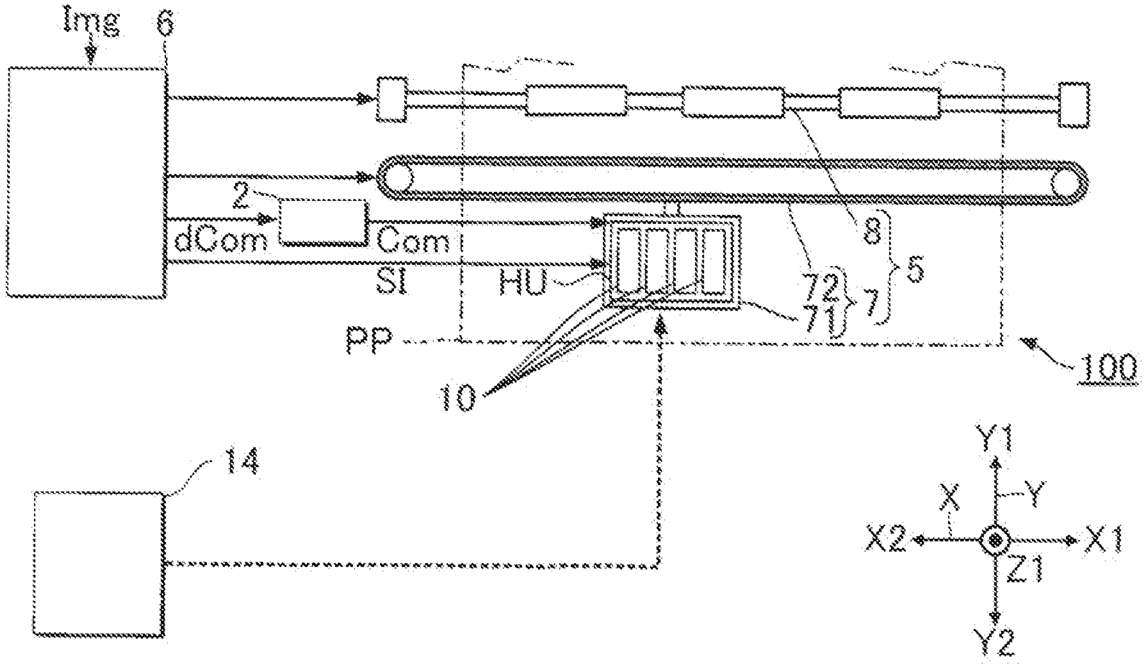
FIG. 1 is a schematic view illustrating a configuration example of a liquid discharge apparatus.

FIG. 1 is a schematic view illustrating a configuration example of the liquid discharge apparatus 100. The liquid discharge apparatus 100 is an ink jet type printing apparatus that discharges ink, which is an example of a liquid, as liquid droplets onto a medium PP. The liquid discharge apparatus 100 of the present embodiment is an ink jet type printing apparatus that discharges ink, which is an example of a liquid, onto the medium PP. The medium PP is typically printing paper, but an optional printing target such as a resin film or fabric can be used as the medium PP.

As illustrated in FIG. 1, the liquid discharge apparatus 100 includes a drive signal generation circuit 2, a liquid container 14, a control module 6, a movement mechanism 5, and a liquid discharge module HU having a plurality of liquid discharge heads 10. In the present embodiment, the liquid discharge module HU has the four liquid discharge heads 10. The control module 6 is an example of a "control portion".

The liquid container 14 is a container for reserving ink. Specific aspects of the liquid container 14 include, for example, a cartridge detachable from the liquid discharge apparatus 100, a bag-shaped ink pack formed of a flexible film, and an ink tank refillable with ink. The type of ink is optional and is not limited to those containing a coloring material.

The control module 6 includes, for example, at least one processing circuit such as a CPU or an FPGA, and at least one storage circuit such as a semiconductor memory.

The movement mechanism 5 changes the relative position of the medium PP and the liquid discharge module HU. The movement mechanism 5 includes a transport mechanism 8 and a head movement mechanism 7.

The transport mechanism 8 transports the medium PP in the Y2 direction under the control of the control module 6. In the example illustrated in FIG. 1, the transport mechanism 8 includes a plurality of transport rollers and a motor that rotates the plurality of transport rollers.

The head movement mechanism 7 reciprocates the liquid discharge module HU in the X1 direction and the X2 direction under the control of the control module 6. In the present embodiment, the X1 direction and the X2 direction are the main scanning directions, and the Y2 direction is the sub-scanning direction. As described above, the liquid discharge apparatus 100 according to the first embodiment is a serial type liquid discharge apparatus that reciprocates along the X-axis. As illustrated in FIG. 1, the head movement mechanism 7 includes a storage case 71 accommodating the liquid discharge module HU and an endless belt 72 to which the storage case 71 is fixed.

The liquid discharge module HU discharges ink from the liquid container 14 to the medium PP in the Z2 direction from the plurality of nozzles N under the control of the control module 6.

The control module 6 controls a discharge operation of the liquid discharge head 10. Specifically, the control module 6 generates a print signal SI, a waveform designation signal dCom, and a signal for controlling the transport mechanism 8 and the head movement mechanism 7.

The drive signal generation circuit 2 converts the digital waveform designation signal dCom to generate a drive signal Com that is an analog signal for driving a piezoelectric element PZ.

The print signal SI is a digital signal for designating an operation type of the piezoelectric element PZ. Specifically, the print signal SI designates the drive signal Com to be supplied to the piezoelectric element PZ. Here, the designation of the operation type of the piezoelectric element PZ includes, for example, designating whether or not to drive the piezoelectric element PZ, or designating the amount of ink to be discharged when the piezoelectric element PZ is driven.

The control module 6 generates various control signals based on various data such as print data Img supplied from the outside. The control module 6 controls the transport mechanism 8 and the head movement mechanism 7 to change the relative position of the medium PP with respect to the liquid discharge module HU based on various control signals and various data stored in its own storage circuit, and controls the liquid discharge module HU such that the piezoelectric element PZ is driven. As a result, the control module 6 adjusts the presence and absence of ink discharge, the discharge amount of ink, the discharge timing of ink, and the like, and controls the execution of the print processing of forming the image corresponding to the print data Img on the medium PP.

1-2. Outline of Liquid Discharge Head 10

Figure 2:
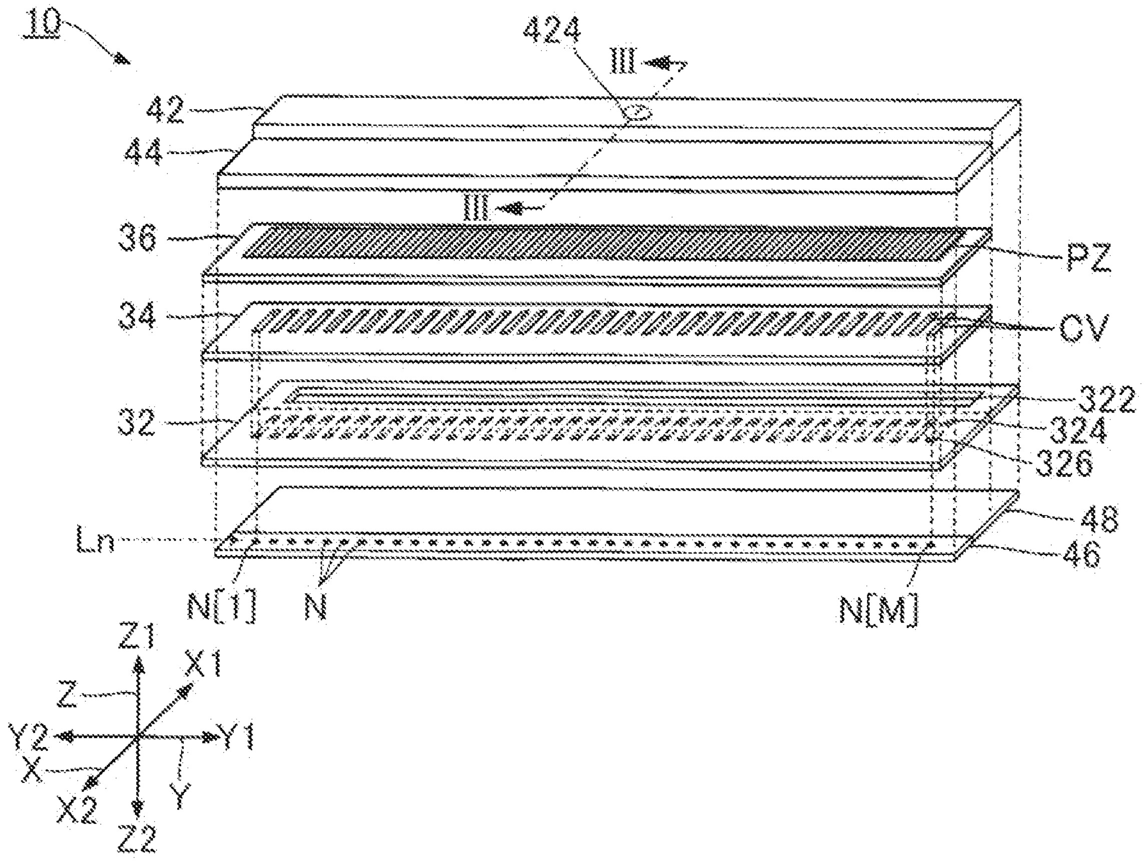
FIG. 2 is an exploded perspective view of a liquid discharge head.
Figure 3:
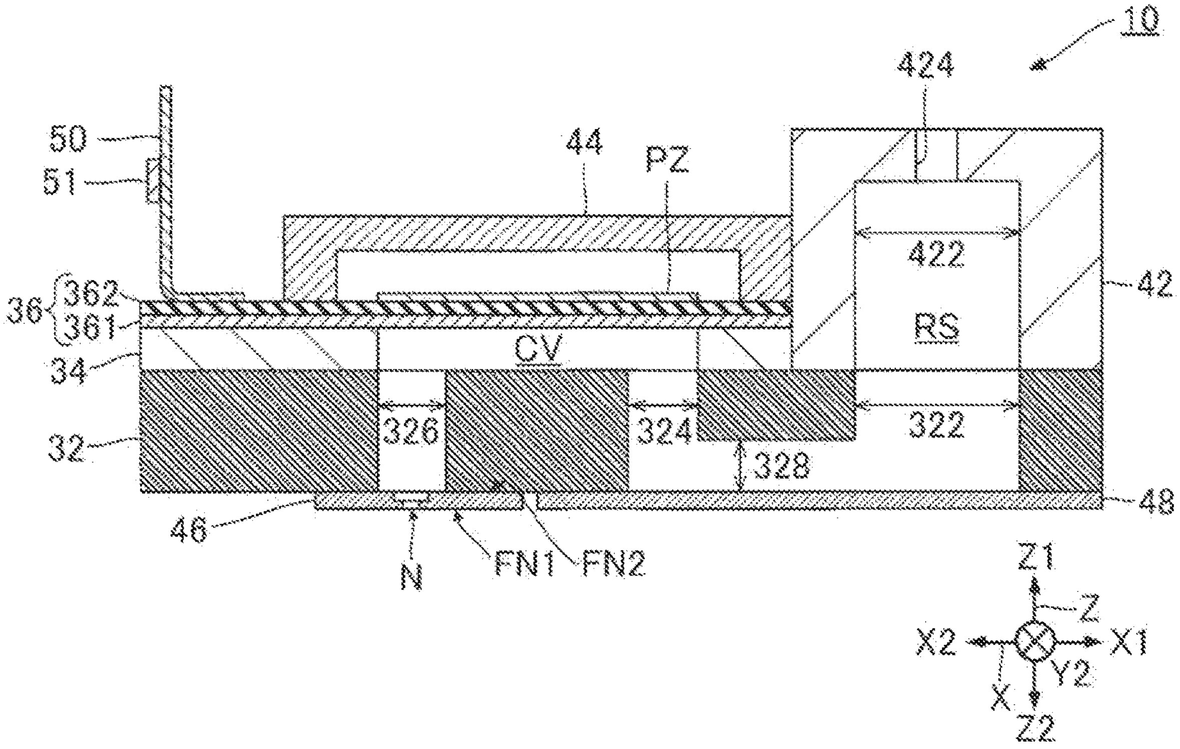
FIG. 3 is a sectional view of the liquid discharge head.

Hereinafter, an outline of the liquid discharge head 10 will be described with reference to FIGS. 2 and 3. FIG. 2 is an exploded perspective view of the liquid discharge head 10. FIG. 3 is a sectional view of the liquid discharge head 10. The diagram illustrated in FIG. 3 illustrates a state in which the liquid discharge head 10 is broken at the III-III cross section illustrated in FIG. 2 and the cross section is viewed in the Y2 direction. The III-III cross section is parallel to the XZ plane and passes through an introduction port 424 described later.

As illustrated in FIGS. 2 and 3, the liquid discharge head 10 includes a substantially rectangular communication plate 32 that is long along the Y-axis. A pressure chamber substrate 34, a diaphragm 36, the M piezoelectric elements PZ, a casing portion 42, and a sealing body 44 are installed on a surface of the communication plate 32 in the Z1 direction. M is an integer of 2 or more. A nozzle substrate 46 and a compliance substrate 48 are installed on the surface of the communication plate 32 in the Z2 direction.

As illustrated in FIG. 2, the nozzle substrate 46 is a plate-shaped member on which the M nozzles N arranged along a nozzle row Ln parallel to the Y-axis are formed. An arrangement direction in which the M nozzles N are arranged is a direction along the Y-axis. The nozzle substrate 46 is, for example, a silicon substrate. As illustrated in FIG. 3, the nozzle substrate 46 has a surface FN1 facing the Z2 direction and a surface FN2 facing the Z1 direction. The surface FN2 is closer to the pressure chamber substrate 34 than the surface FN1. The surface FN1 is an example of a "discharge surface". The thickness direction of the nozzle substrate 46 is a direction along the Z-axis. In the present embodiment, the nozzle row Ln is parallel to the Y-axis, and is a line segment from the gravity center of a downstream nozzle portion ND described later of the nozzle N positioned most in the Y1 direction to the gravity center of the downstream nozzle portion ND of the nozzle N positioned most in the Y2 direction, among the M nozzles N. The fact that the M nozzles N are arranged along the nozzle row Ln is a concept including the fact that at least some of the M nozzles N are arranged with a slight deviation in a direction intersecting the nozzle row Ln, and means that some or all of the respective M nozzles N overlap when viewed along the nozzle row Ln.

Each of the nozzles N is a through hole through which ink passes. Details of the shape of the nozzle N will be described later based on FIG. 5.

The communication plate 32 is a plate-shaped member provided with a flow path through which ink flows. As illustrated in FIGS. 2 and 3, the communication plate 32 is formed with an opening portion 322, a second communication passage 324, and a first communication passage 326. The opening portion 322 is a through hole provided in common with the M nozzles N along the Y-axis when viewed along the Z-axis. Hereinafter, viewing along the Z-axis may be referred to as "in plan view". The second communication passage 324 and the first communication passage 326 are through holes individually formed for each of the nozzles N. Further, as illustrated in FIG. 3, a common flow path 328 over the M second communication passages 324 is formed on the surface of the communication plate 32 in the Z2 direction. The common flow path 328 is a flow path that allows the opening portion 322 and the M second communication passages 324 to communicate with each other.

The casing portion 42 is formed with the accommodating portion 422 and the introduction port 424. The accommodating portion 422 is a recess portion having an outer shape corresponding to the opening portion 322 of the communication plate 32. The introduction port 424 is a through hole that communicates with the accommodating portion 422. As understood from FIG. 3, a space in which the opening portion 322 of the communication plate 32 and the accommodating portion 422 of the casing portion 42 communicate with each other functions as a liquid reserve chamber RS. The ink supplied from the liquid container 14 and passing through the introduction port 424 is reserved in the liquid reserve chamber RS.

The compliance substrate 48 has a function of cushioning vibration of ink in the liquid reserve chamber RS. The compliance substrate 48 includes, for example, a flexible sheet member capable of elastic deformation.

As illustrated in FIGS. 2 and 3, the pressure chamber substrate 34 is a plate-shaped member in which M pressure chambers CV corresponding to each of the M nozzles N are formed. The M pressure chambers CV are arranged to be spaced apart from each other along the Y-axis. Each of the pressure chambers CV is an opening extending along the X-axis. The end portion of the pressure chamber CV in the X1 direction overlaps the one second communication passage 324 in plan view, and the end portion of the pressure chamber CV in the X2 direction overlaps the one first communication passage 326 of the communication plate 32 in plan view.

The diaphragm 36 is installed on the surface of the pressure chamber substrate 34 in the direction opposite to the surface facing the communication plate 32. The diaphragm 36 is a plate-shaped member that is elastically deformable. As illustrated in FIG. 3, the diaphragm 36 is configured by stacking an elastic film 361 and an insulating film 362. The insulating film 362 is positioned in the direction opposite to the pressure chamber substrate 34 when viewed from the elastic film 361.

As can be understood from FIG. 3, the communication plate 32 and the diaphragm 36 face each other at an interval inside each of the pressure chambers CV. The pressure chamber CV is positioned between the communication plate 32 and the diaphragm 36, and is a space for imparting pressure to the ink accommodated in the pressure chamber CV. The diaphragm 36 forms a portion of the wall surface of the pressure chamber CV. The ink reserved in the liquid reserve chamber RS branches from the common flow path 328 to each of the second communication passages 324, is supplied in parallel to the M pressure chambers CV, and is accommodated. That is, the liquid reserve chamber RS functions as a common liquid chamber for supplying ink to the plurality of pressure chambers CV.

As illustrated in FIGS. 2 and 3, the M piezoelectric elements PZ corresponding to each of the M nozzles N are installed on the surface of the diaphragm 36 in the direction opposite to the pressure chamber substrate 34. Each of the piezoelectric elements PZ is an actuator that is deformed by the supply of the drive signal Com, and is formed in a long shape along the X-axis. The M piezoelectric elements PZ are arranged along the Y-axis to correspond to the M pressure chambers CV.

Hereinafter, in order to distinguish each of the M piezoelectric elements PZ, the piezoelectric elements PZ may be referred to as the first, second, . . . , and M-th in order. Further, the m-th piezoelectric element PZ may be referred to as the piezoelectric element PZ [m]. The variable m is an integer satisfying 1 or more and M or less. Further, when the component, signal, and the like of the liquid discharge apparatus 100 corresponds to the piezoelectric element PZ, a reference numeral to represent the corresponding component, signal, and the like is represented by being attached with a suffix [m] that indicates the correspondence to the m-th. For example, the m-th nozzle N may be expressed as the nozzle N [m]. As illustrated in FIG. 2, among the M nozzles N, the nozzle N positioned most in the Y2 direction is represented as the nozzle N [1], and the nozzle N positioned most in the Y1 direction is represented as the nozzle N [M].

When the diaphragm 36 vibrates in conjunction with the deformation of the piezoelectric element PZ, the pressure inside the pressure chamber CV fluctuates, and the ink filled in the pressure chamber CV passes through the first communication passage 326 and the nozzle N and is discharged. Instead of the piezoelectric element PZ, a heat generating element as a "driving element" can be used to fluctuate the pressure in the pressure chamber CV.

The sealing body 44 of FIGS. 2 and 3 accommodates the M piezoelectric elements PZ, and is a structure that protects from the outside air and reinforces the mechanical strength of the pressure chamber substrate 34 and the diaphragm 36.

As illustrated in FIG. 3, a wiring substrate 50 is bonded to the surface of the diaphragm 36. A plurality of wirings for electrically coupling the control module 6 and the liquid discharge head 10 are formed on the wiring substrate 50. For example, the flexible wiring substrate 50 such as FPC or FFC is preferably adopted. A drive circuit 51 is mounted on the wiring substrate 50. The drive circuit 51 is an electric circuit that switches whether or not to supply the drive signal Com to the piezoelectric element PZ under the control of the print signal SI.

Figure 4:
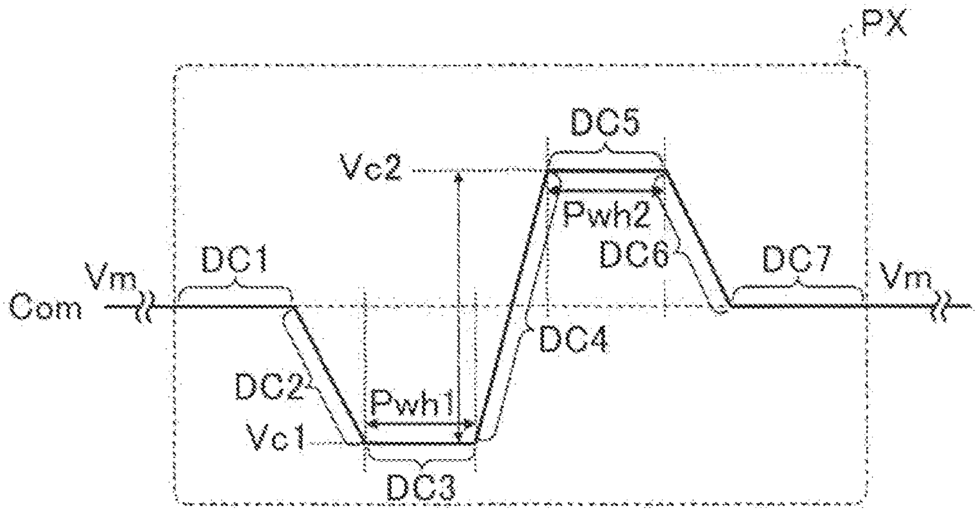
FIG. 4 is a diagram illustrating an example of a drive signal.

FIG. 4 is an example of the drive signal Com. The drive signal Com has a discharge waveform PX for driving the piezoelectric element PZ. The discharge waveform PX has a holding element DC1, an expansion element DC2, a holding element DC3, a contraction element DC4, a holding element DC5, an expansion element DC6, and a holding element DC7. The discharge waveform PX illustrated in FIG. 4 is suitable when a piezoelectric element is used as the "driving element".

The holding element DC1 holds a reference potential Vm. Immediately after the holding element DC1, the expansion element DC2 changes the potential from the reference potential Vm to a holding potential Vc1 such that the volume of the pressure chamber CV expands. The holding potential Vc1 is lower than the reference potential Vm. Immediately after the expansion element DC2, the holding element DC3 holds the holding potential Vc1 for a period Pwh1. Immediately after the holding element DC3, the contraction element DC4 changes the potential from the holding potential Vc1 to the holding potential Vc2 to contract the volume of the pressure chamber CV. The holding potential Vc2 is higher than the reference potential Vm. Immediately after the contraction element DC4, the holding element DC5 holds the holding potential Vc2 for a period Pwh2. Immediately after the holding element DC5, the expansion element DC6 changes the potential from the holding potential Vc2 to the reference potential Vm such that the volume of the pressure chamber CV expands. Immediately after the expansion element DC6, the holding element DC7 holds the reference potential Vm. Contracting the volume of the pressure chamber CV means increasing the pressure of the ink in the pressure chamber CV. Expanding the volume of the pressure chamber CV means lowering the pressure of the ink in the pressure chamber CV.

1-3. About Shape of Nozzle N

Figure 5:
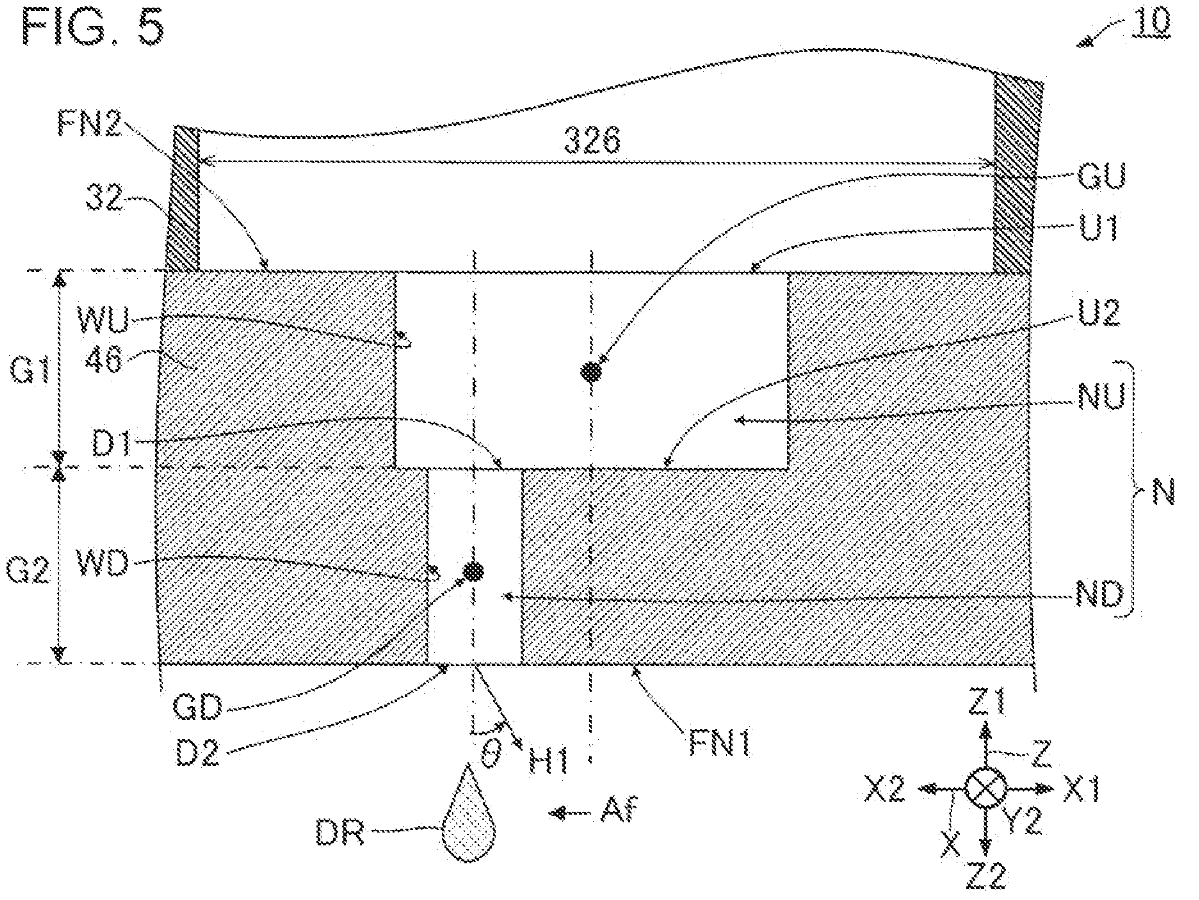
FIG. 5 is an enlarged view in the vicinity of a nozzle in FIG. 3.
Figure 6:
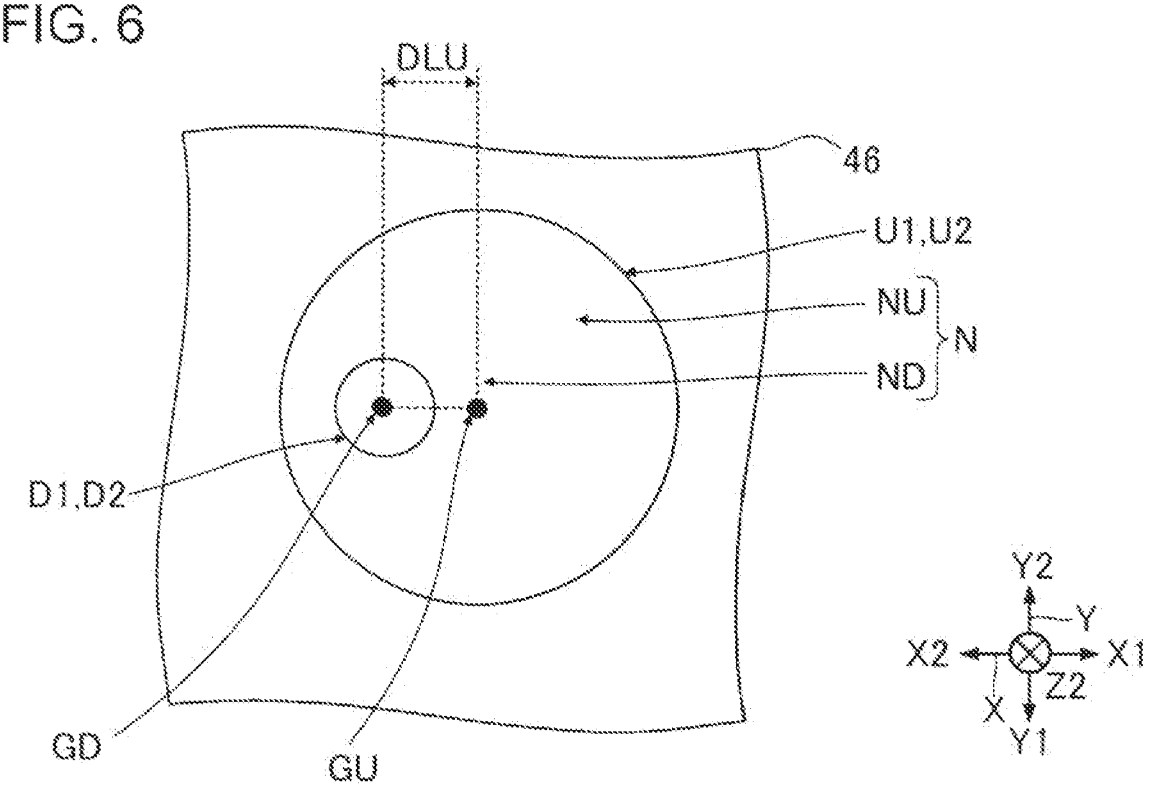
FIG. 6 is a plan view of the vicinity of the nozzle.

FIG. 5 is an enlarged view of the vicinity of the nozzle N in FIG. 3. FIG. 6 is a plan view of the vicinity of the nozzle N. As illustrated in FIGS. 5 and 6, the nozzle N has the downstream nozzle portion ND and an upstream nozzle portion NU positioned upstream of the downstream nozzle portion ND. The upstream nozzle portion NU includes a supply opening U1 opened on the surface FN2 and a bottom surface U2 facing the supply opening U1. More specifically, the upstream nozzle portion NU is a substantially cylindrical space having the supply opening U1 and the bottom surface U2 as a bottom surface and a wall surface WU as a side surface. The bottom surface U2 is a surface of which normal vector is the Z-axis. In other words, the bottom surface U2 is a surface parallel to the XY plane. However, the bottom surface U2 may be a surface intersecting the XY plane. In the first embodiment, the shapes of the supply opening U1 and the bottom surface U2 are substantially the same. Substantially the same includes not only the case of being completely the same but also the case of being considered to be the same in consideration of manufacturing errors.

The downstream nozzle portion ND includes a discharge opening D2 opened on the surface FN1 and a coupling portion D1 opened on the bottom surface U2. More specifically, the downstream nozzle portion ND is a substantially cylindrical space having the discharge opening D2 and the coupling portion D1 as the bottom surface and the wall surface WD as the side surface. In FIG. 6, the shapes of the supply opening U1, the bottom surface U2, the coupling portion D1, and the discharge opening D2 are circular, but are not limited to a circular shape and may be an optional shape, for example, an elliptical shape or a rectangular shape. The diameter of the coupling portion D1 and the discharge opening D2 is, for example, between 10 μm and 30 μm. The diameters of the supply opening U1 and the bottom surface U2 are, for example, from 15 μm up to a smaller value between the upper limit value corresponding to the resolution of the liquid discharge apparatus 100 and the width of the first communication passage 326. For example, when the resolution of the liquid discharge apparatus 100 is 600 dpi, the upper limit value according to the resolution of the liquid discharge apparatus 100 is obtained at 25.4 mm/600, which is substantially 0.0423 mm, in other words, substantially 42.3 μm. "μm" means micrometer. "mm" means millimeter. dpi is an abbreviation for dots per inch.

As illustrated in FIG. 6, in plan view, the discharge opening D2 and the coupling portion D1 are positioned inside the supply opening U1 and the bottom surface U2. Therefore, in plan view, the cross-sectional area of the upstream nozzle portion NU is larger than the cross-sectional area of the downstream nozzle portion ND. However, in plan view, the discharge opening D2 and the coupling portion D1 have substantially the same area, but may have different areas. For example, the downstream nozzle portion ND may have a tapered shape in which the cross-sectional area becomes smaller toward the Z2 direction. Similarly, the supply opening U1 and the bottom surface U2 have substantially the same area, but may have different areas. For example, the upstream nozzle portion NU may have a tapered shape in which the cross-sectional area becomes smaller toward the Z2 direction.

It was obtained by an experiment that the discharge direction of ink changes as a gravity center GD of the downstream nozzle portion ND and a gravity center GU of the upstream nozzle portion NU are separated from each other in plan view. The gravity center is a point at which the sum of the first-order moments of the cross section becomes zero in the target shape. For example, when the target shape is circular, the gravity center is the center of the circle, and when the target shape is a parallel quadrilateral, the gravity center is the intersection of two diagonal lines of the parallel quadrilateral. In the following description, the deviation of the position of the gravity center GU with respect to the position of the gravity center GD may be described as "coaxiality". The distance between the gravity center GD and the gravity center GU in plan view may be described as "the magnitude of the deviation of the coaxiality". The fact that the gravity center GD and the gravity center GU are close to each other may be described as having a high degree of coaxiality. Further, a direction from the gravity center GU toward the gravity center GD may be described as a direction of the deviation of the coaxiality.

Due to the deviation of the coaxiality, the discharge direction of ink is inclined from the gravity center GD toward the gravity center GU in plan view. In other words, the ink is discharged to be deviated in a direction opposite to the direction of the deviation of the coaxiality. In the example of FIG. 5, the direction of the deviation of the coaxiality is the X2 direction, and the ink is discharged from the nozzle N to be deviated in the X1 direction. However, in the present embodiment, the coaxiality differs depending on the nozzle N. It is considered that the reasons why the ink discharge direction is inclined due to the deviation of the coaxiality are the fact that the shaking of the meniscus of ink formed in the nozzle N causes deviation from the gravity center GU at the discharge timing because the gravity center GD of the downstream nozzle portion ND is deviated from the gravity center GU of the upstream nozzle portion NU, the fact that the meniscus shifts in one direction when the meniscus is pulled in the Z1 direction and reaches the upstream nozzle portion NU, and the fact that a pressure gradient is generated in the direction orthogonal to the Z-axis in the downstream nozzle portion ND. A worker who manufactures the nozzle substrate 46 forms the downstream nozzle portion ND on a silicon wafer and then forms the upstream nozzle portion NU on the silicon wafer. For example, in plan view, the worker forms the distance between the gravity center GD and the gravity center GU to be, for example, 3 μm or more and 15 μm or less, preferably 4 μm or more and 11 μm or less.

1-4. In Regard to Air Flow

As described above, in the print processing, the liquid discharge apparatus 100 moves the liquid discharge module HU having the plurality of liquid discharge heads 10 in the X1 direction or the X2 direction, and further discharges ink from the nozzle N, so that air flow may be generated and a deviation may be generated in the discharge direction.

The direction in which the air flow is generated differs depending on the movement speed of the liquid discharge module HU in the main scanning direction, the usage aspect of the liquid discharge apparatus 100 such as a discharge period, the configuration of the liquid discharge apparatus 100 such as the length of the nozzle row Ln, and the like. For example, as the nozzle row Ln becomes longer, the air removed by the discharged ink is increased. When the amount of air to be removed increases, the ink discharged from the nozzle N positioned at the end portion of the nozzle row Ln tends to deviate in the direction in which the nozzle row Ln spreads due to the air flow formed by the removed air. More specifically, the ink discharged from the nozzle N positioned at the end portion of the nozzle row Ln in the Y1 direction tends to deviate in the Y1 direction due to the air flow, and the ink discharged from the nozzle N positioned at the end portion of the nozzle row Ln in the Y2 direction tends to deviate in the Y2 direction due to the air flow. On the other hand, when the nozzle row Ln is short, the air removed by the discharged ink is decreased. Therefore, the amount of deviation from the nozzle row Ln in the spreading direction is reduced. On the other hand, the ink discharged from the nozzle N positioned at the end portion of the nozzle row Ln tends to deviate in the narrowing direction of the nozzle row Ln due to the air flow in the narrowing direction of the nozzle row Ln. More specifically, the ink discharged from the nozzle N positioned at the end portion of the nozzle row Ln in the Y1 direction tends to deviate in the Y2 direction due to the air flow, and the ink discharged from the nozzle N positioned at the end portion of the nozzle row Ln in the Y2 direction tends to deviate in the Y1 direction due to the air flow. As described above, the direction in which the air flow is generated may differ depending on various factors due to the specifications of the liquid discharge apparatus 100. Therefore, in regard to the deviation in the ink discharge direction generated by the air flow, measures for suppressing the deviation are required according to the specifications of the liquid discharge apparatus 100, respectively.

1-5. Disposition of M Nozzles N

In the present embodiment, the deviation in the ink discharge direction generated by the air flow is canceled by shifting the coaxiality in advance, the ink discharge direction is brought closer to the Z2 direction, and the decrease in the quality of the image formed on the medium PP due to the air flow is suppressed. For example, in the example illustrated in FIG. 5, a liquid droplet DR discharged from the nozzle N flies in an H1 direction illustrated in FIG. 5 when no air flow is generated. The H1 direction is a direction deviated in the X1 direction. More specifically, the H1 direction is a direction rotated by θ degrees counterclockwise in the Z2 direction when viewed in the Y2 direction. When an air flow Af in the X2 direction is generated, the liquid droplet DR flies in the Z2 direction because the deviation in the flight direction in the H1 direction is cancelled by the air flow Af. In the first embodiment, a case where the ink discharge direction is deviated in the main scanning direction due to the air flow will be described.

Figure 7:
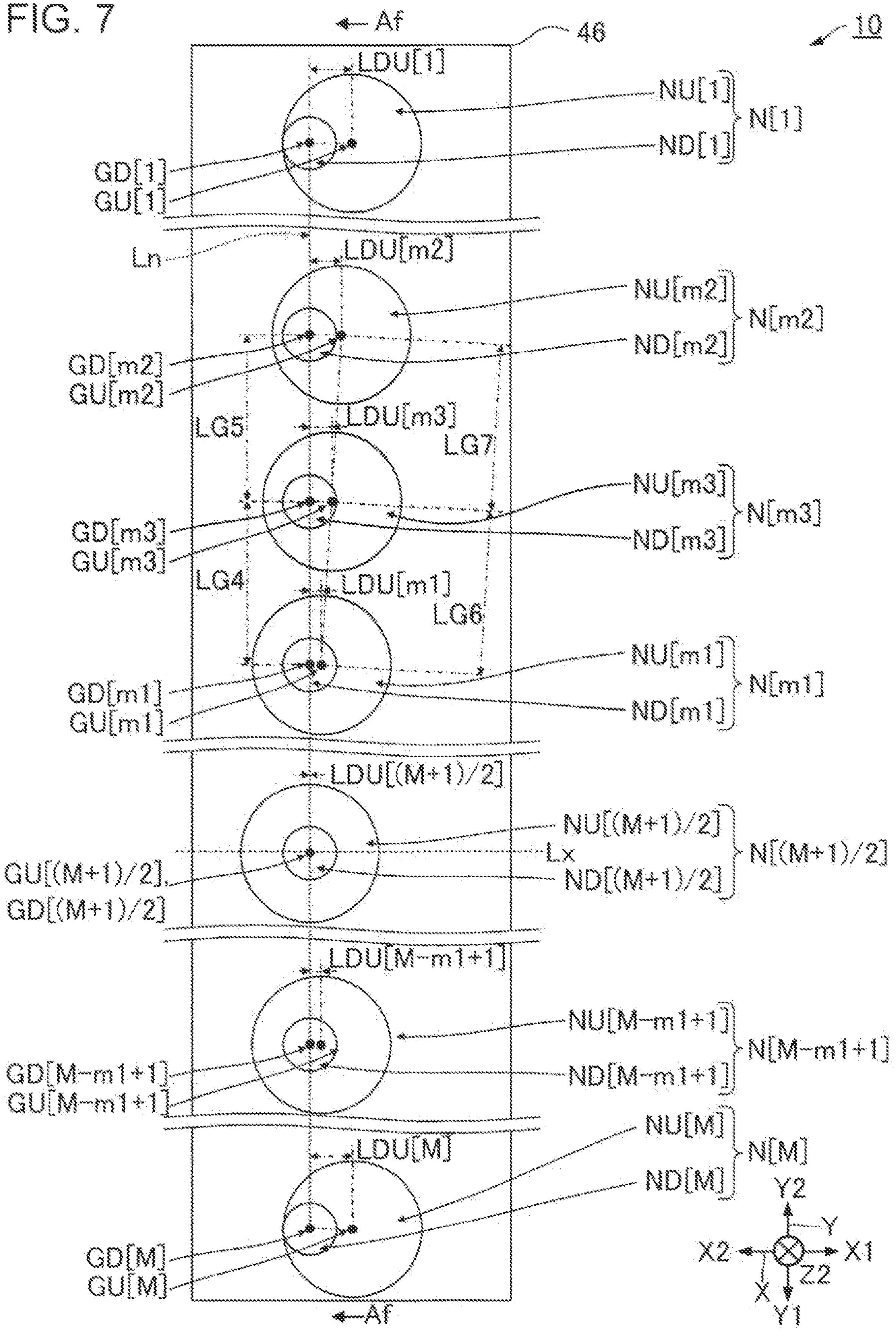
FIG. 7 is a diagram illustrating an arrangement aspect of the M nozzles.

FIG. 7 is a diagram illustrating an arrangement aspect of the M nozzles N. In FIG. 7, for convenience of explanation, M is set to an odd number of 9 or more, and the arrangement aspect of the nozzles N in the first embodiment will be described by representing the seven nozzles N as the nozzle N [1], the nozzle N [m2], the nozzle N [m3], the nozzle N [m1], the nozzle N [(M+1)/2], the nozzle N [M−m1+1], and the nozzle N [M] among the M nozzles N. m1, m2, and m3 are greater than 1 and less than (M+1)/2, and are integers for which m2+1=m3=m1−1 holds. Since M is an odd number, the nozzle N [(M+1)/2] is positioned at the center of the nozzle row Ln. In regard to the M nozzles N, a distance LDU between the gravity center GD of the downstream nozzle portion ND and the gravity center GU of the upstream nozzle portion NU is a distance in a direction along the X-axis orthogonal to a direction along the Y-axis that is the arrangement direction. In FIG. 7, the reference numerals of the supply opening U1, the bottom surface U2, the coupling portion D1, and the discharge opening D2 are not illustrated to avoid complicating the drawing.

In the first embodiment, a state is assumed in which the ink discharged from the nozzle N positioned at the end portion of the nozzle row Ln is more susceptible to the influence of the air flow Af in the X2 direction, and the discharge direction is deviated in the X2 direction. Among the M nozzles N, the upstream nozzle portion NU and the downstream nozzle portion ND are disposed substantially linearly symmetrical with respect to a straight line Lx as an axis. The straight line Lx is a straight line passing through the gravity center GD [(M+1)/2] of the downstream nozzle portion ND [(M+1)/2] and the gravity center GU [(M+1)/2] of the upstream nozzle portion NU [(M+1)/2] in the nozzle N [(M+1)/2] positioned at the center of the nozzle row Ln and parallel to the X-axis. As illustrated in FIG. 7, it is preferable that the nozzle N [(M+1)/2] has no deviation in coaxiality. That is, in plan view, the distance LDU [(M+1)/2] between the gravity center GD [(M+1)/2] and the gravity center GU [(M+1)/2] is substantially 0. When the distance LDU is 1 μm or less, it is considered that there is no deviation in coaxiality. On the other hand, among the M nozzles N, the coaxiality of the nozzles N other than the nozzle N [(M+1)/2] is deviated in the X2 direction. Further, the coaxiality becomes lower as a distance to the end portion of the nozzle row Ln decreases.

It will be described using the nozzle N [m2] and the nozzle N [m1] that the coaxiality decreases as a distance to the end portion of the nozzle row Ln decreases. As can be understood from FIG. 7, the nozzle N [m1] is positioned closer to the center of the nozzle row Ln than the nozzle N [m2]. Further, the nozzle N [m2] is positioned closer to the nozzle N [1] at one end than the nozzle N [m1]. Further, the distance between the nozzle N [1] at one end and the nozzle N [m1] is shorter than the distance between the nozzle N [M] at the other end and the nozzle N [m1]. The distance LDU [m2] between the position of the gravity center GD [m2] of the downstream nozzle portion ND [m2] and the position of the gravity center GU [m2] of the upstream nozzle portion NU [m2] is longer than the distance LDU [m1] between the position of the gravity center GD [m1] of the downstream nozzle portion ND [m1] and the position of the gravity center GU [m1] of the upstream nozzle portion NU [m1]. In the present embodiment, the nozzle N [(M+1)/2] is provided at the center of the nozzle row Ln, but it is not necessary that the nozzle N is provided at the center of the nozzle row Ln.

Further, as illustrated in FIG. 7, the coaxiality becomes monotonically lower as a distance to the end portion of the nozzle row Ln decreases. It will be described using the nozzle N [m2], the nozzle N [m3], and the nozzle N [m1] that the coaxiality becomes monotonically lower as a distance to the end portion of the nozzle row Ln decreases. As illustrated in FIG. 7, the nozzle N [m3] is positioned between the nozzle N [m2] and the nozzle N [m1]. As illustrated in FIG. 7, the distance LDU [m3] between the gravity center GD [m3] of the downstream nozzle portion ND [m3] and the gravity center GU [m3] of the upstream nozzle portion NU [m3] is longer than the distance LDU [m1], and is shorter than the distance LDU [m2].

In the example of FIG. 7, the coaxiality becomes monotonically lower as a distance from the nozzle N [(M+1)/2] increases. The nozzle N [m1] and the nozzle N [M−m1+1] have substantially the same distance from the nozzle N [(M+1)/2]. Therefore, the distance LDU [M−m1+1] between the downstream nozzle portion ND [M−m1+1] of the nozzle N [M−m1+1] and the upstream nozzle portion NU [M−m1+1] is substantially the same as the distance LDU [m1].

Furthermore, as can be understood from FIG. 7, in the nozzle substrate 46 according to the first embodiment, there is a characteristic that the interval between the adjacent downstream nozzle portions ND is more constant than the interval between the adjacent upstream nozzle portions NU. In other words, the variation in the interval between the adjacent downstream nozzle portions ND is smaller than the variation in the interval between the adjacent upstream nozzle portions NU. Specifically, in plan view, the absolute value of the difference between a distance LG4 and a distance LG5 is smaller than the absolute value of the difference between a distance LG6 and a distance LG7. The distance LG4 is a distance between the gravity center GD [m3] and the gravity center GD [m1]. The distance LG5 is a distance between the gravity center GD [m3] and the gravity center GD [m2]. The distance LG6 is a distance between the gravity center GU [m3] and the gravity center GU [m1]. The distance LG7 is a distance between the gravity center GU [m3] and the gravity center GU [m2]. In the example of FIG. 7, the absolute value of the difference between the distance LG4 and the distance LG5 is substantially 0.

The distance LG4 is an example of a "fourth distance". The distance LG5 is an example of a "fifth distance". The distance LG6 is an example of a "sixth distance". The distance LG7 is an example of a "seventh distance".

Further, as illustrated in FIG. 7, in plan view, the gravity center GD of each of the M downstream nozzle portions ND is positioned on the nozzle row Ln parallel to the Y-axis. In other words, the positions of the gravity centers GD of the M downstream nozzle portions ND on the X-axis are substantially the same. On the other hand, since the positions of the upstream nozzle portions NU are set according to the deviation due to the air flow, the positions of the respective gravity centers GU of the M upstream nozzle portions NU on the X-axis are different from each other in plan view.

In the example of FIG. 7, the nozzle N [m1] corresponds to the "first nozzle", the nozzle N [m2] corresponds to the "second nozzle", and the nozzle N [m3] corresponds to the "third nozzle". The pressure chamber CV [m1] communicating with the nozzle N [m1] corresponds to the "first pressure chamber". The piezoelectric element PZ [m1] that imparts pressure to the ink in the pressure chamber CV [m1]

corresponds to the "first driving element" and also corresponds to the "first piezoelectric element". The pressure chamber CV [m2] communicating with the nozzle N [m2] corresponds to the "second pressure chamber". The piezoelectric element PZ [m2] that imparts pressure to the ink in the pressure chamber CV [m2] corresponds to the "second driving element" and also corresponds to the "second piezoelectric element". The pressure chamber CV [m3] communicating with the nozzle N [m3] corresponds to the "third pressure chamber". The piezoelectric element PZ [m3] that imparts pressure to the ink in the pressure chamber CV [m3] corresponds to the "third driving element". The nozzle N [1] corresponds to "the nozzle at one end among the nozzles at both ends", and the nozzle N [M] corresponds to "the nozzle at the other end among the nozzles at both ends". When the nozzle N [m1] corresponds to the "first nozzle", the downstream nozzle portion ND [m1] corresponds to the "first downstream nozzle portion", the upstream nozzle portion NU [m1] corresponds to the "first upstream nozzle portion", and the distance LDU [m1] corresponds to the "first distance". When the nozzle N [m2] corresponds to the "second nozzle", the downstream nozzle portion ND [m2] corresponds to the "second downstream nozzle portion", the upstream nozzle portion NU [m2] corresponds to the "second upstream nozzle portion", and the distance LDU [m2] corresponds to the "second distance". When the nozzle N [m3] corresponds to the "third nozzle", the downstream nozzle portion ND [m3] corresponds to the "third downstream nozzle portion", the upstream nozzle portion NU [m3] corresponds to the "third upstream nozzle portion", and the distance LDU [m3] corresponds to the "third distance". However, the nozzle N [1] may correspond to "a nozzle at one end among the nozzles at both ends".

1-6. Summary of First Embodiment

Hereinafter, a summary of the first embodiment will be described using the m-first nozzle [m1] and the m-second nozzle N [m2] among the M nozzles N. m1 is an integer of 2 or more and (M+1)/2 or less. m2 is an integer of 1 or more and less than m1.

As described above, the liquid discharge head 10 according to the first embodiment includes the piezoelectric element PZ [m1], the piezoelectric element PZ [m2] different from the piezoelectric element PZ [m1], the pressure chamber CV [m1] that is partitioned in the pressure chamber substrate 34 and imparts pressure to the ink by driving the piezoelectric element PZ [m1], the pressure chamber CV [m2] that is partitioned in the pressure chamber substrate 34 and imparts pressure to the ink by driving the piezoelectric element PZ [m2], the nozzle N [m1] that is one of the plurality of nozzles N included in the nozzle row Ln formed on the nozzle substrate 46 and communicates with the pressure chamber CV [m1], and the nozzle N [m2] that is one of the plurality of nozzles N and communicates with the pressure chamber CV [m2], and the nozzle N [m1] is positioned closer to the center of the nozzle row Ln than the nozzle N [m2]. The nozzle N [m2] is closer to the nozzle N [1], which is the nozzle N at one end among the nozzles N at both ends of the nozzle row Ln, than the nozzle N [m1], the distance between the nozzle N [1] and the nozzle N [m1] is less than or equal to the distance between the nozzle N [M] at the other end among the nozzles N at both ends and the nozzle N [m1], the nozzle substrate 46 has a surface FN1 positioned opposite to the pressure chamber substrate 34, the nozzle N [m1] includes the downstream nozzle portion ND [m1] opened on the surface FN1 and the upstream nozzle portion NU [m1] of which the cross-sectional area when viewed along the Z-axis is larger than the cross-sectional area of the downstream nozzle portion ND [m1] and that is positioned upstream of the downstream nozzle portion ND [m1], the nozzle N [m2] includes the downstream nozzle portion ND [m2] opened on the surface FN1 and the upstream nozzle portion NU [m2] of which the cross-sectional area is larger than the cross-sectional area of the downstream nozzle portion ND [m2] when viewed in the thickness direction and that is positioned upstream of the downstream nozzle portion ND [m2], and in a case where, when viewed along the Z-axis, the distance between the position of the gravity center GD [m1] of the downstream nozzle portion ND [m1] and the position of the gravity center GU [m1] of the upstream nozzle portion NU [m1] is set as the distance LDU [m1], and, when viewed along the Z-axis, the distance between the position of the gravity center GD [m2] of the downstream nozzle portion ND [m2] and the position of the gravity center GU [m2] of the upstream nozzle portion NU [m2] is set as the distance LDU [m2], the distance LDU [m2] is larger than the distance LDU [m1].

The liquid discharge head 10 according to the first embodiment cancels the deviation in the discharge direction of the ink generated by the air flow Af by shifting the coaxiality in advance. Therefore, since the liquid discharge head 10 according to the first embodiment can bring the ink discharge direction closer to the Z2 direction, it is possible to suppress the decrease of the quality of the image formed on the medium PP due to the air flow Af.

Further, although the liquid discharge head 10 according to the first embodiment discharges ink from the M nozzles N at the same time, by shifting the coaxiality in advance, the position of the ink landing on the medium PP can be set to be closer to an ideal landing position. Therefore, in the liquid discharge head 10 according to the first embodiment, it is possible to suppress the decrease of the quality of the image formed on the medium PP due to the air flow Af while the period required for the print processing is maintained, in other words, while the productivity is maintained.

Further, shifting the discharge direction can be realized not only by the aspect of shifting the coaxiality but also by the aspect of inclining the downstream nozzle portion ND with respect to the surface FN1. However, an aspect in which the downstream nozzle portion ND is inclined with respect to the surface FN1 is more difficult to manufacture than an aspect in which the coaxiality is shifted, particularly in fine processing using etching and the like. Therefore, the liquid discharge head 10 according to the first embodiment can be easily manufactured as compared with the aspect in which the downstream nozzle portion ND is inclined with respect to the surface FN1. However, in the present embodiment, the downstream nozzle portion ND may be inclined with respect to the surface FN1.

The distance LDU [m1] and the distance LDU [m2] are distances in a direction along the X-axis orthogonal to a direction along the Y-axis that is an arrangement direction in which the M nozzles N are arranged.

The liquid discharge head 10 according to the first embodiment can improve the quality of an image formed on the medium PP by adjusting the landing deviation in the direction along the X-axis orthogonal to the arrangement direction.

Hereinafter, a summary of the first embodiment will be described using the m-third nozzle N [m3] which is larger than m2 and smaller than m1. The liquid discharge head 10 according to the first embodiment further includes the piezoelectric element PZ [m3] different from the piezoelectric element PZ [m1] and the piezoelectric element PZ [m2], the pressure chamber CV [m3] that is partitioned in the pressure chamber substrate 34 and imparts pressure to the ink by driving the piezoelectric element PZ [m3], the nozzle N [m3] that is one of the M nozzles N, is positioned between the nozzles N [m1] and the nozzle N [m2] in the arrangement direction, and communicates with the pressure chamber CV [m3], in which the nozzle N [m3] includes the downstream nozzle portion ND [m3] opened on the surface FN1 and the upstream nozzle portion NU [m3] of which the cross-sectional area when viewed along the Z-axis is larger than the cross-sectional area of the downstream nozzle portion ND [m3] and that is positioned upstream of the downstream nozzle portion ND [m3], and in a case where, when viewed along the Z-axis, the distance between the position of the gravity center GD [m3] of the downstream nozzle portion ND [m3] and the position of the gravity center GU [m3] of the upstream nozzle portion NU [m3] is set as the distance LDU [m3], the distance LDU [m3] is longer than the distance LDU [m1] and shorter than the distance LDU [m2].

Further, when m2+1=m3=m1−1 holds, the nozzle N [m1] is positioned next to the nozzle N [m3], the nozzle N [m2] is positioned next to the nozzle N [m3] and positioned in the direction opposite to the direction from the nozzle N [m3] to the nozzle N [m1], and in a case where, when viewed in the direction along the Z-axis, the distance between the position of the gravity center GD [m3] of the downstream nozzle portion ND [m3] and the position of the gravity center GD [m1] of the downstream nozzle portion ND [m1] is set as the distance LG4, the distance between the position of the gravity center GD [m3] of the downstream nozzle portion ND [m3] and the position of the gravity center GD [m2] of the downstream nozzle portion ND [m2] is set as the distance LG5, the distance between the position of the gravity center GU [m3] of the upstream nozzle portion NU [m3] and the position of the gravity center GU [m1] of the upstream nozzle portion NU [m1] is set as the distance LG6, and the distance between the position of the gravity center GU [m3] of the upstream nozzle portion NU [m3] and the position of the gravity center GU [m2] of the upstream nozzle portion NU [m2] is set as the distance LG7, the absolute value of the difference between the distance LG4 and the distance LG5 is smaller than the absolute value of the difference between the distance LG6 and the distance LG7.

Since the ink is discharged from the downstream nozzle portion ND, in a case where the interval between the adjacent downstream nozzle portions ND is not constant, the interval between dots formed on the medium PP is not constant, and the quality of the image is decreased. Therefore, it is preferable that the interval between the adjacent downstream nozzle portions ND is constant. As described above, the liquid discharge head 10 according to the first embodiment can improve the quality of the image formed on the medium PP as compared with the aspect in which the interval between the adjacent upstream nozzle portions NU is more constant than the interval between the adjacent downstream nozzle portions ND.

Further, as illustrated in FIG. 7, the positions of the M downstream nozzle portions ND on the X-axis are substantially the same. When the position of the downstream nozzle portion ND on the X-axis is deviated, the position at which discharge is started differs for each nozzle N. When the position at which the discharge is started differs for each nozzle N, it becomes difficult to adjust the landing position. Therefore, in the liquid discharge head 10 according to the first embodiment, the landing position can be easily adjusted as compared with the aspect in which the M upstream nozzle portions NU are provided along the Y-axis.

Further, the liquid discharge head 10 according to the first embodiment has the nozzle substrate 46 according to the first embodiment. The nozzle substrate 46 according to the first embodiment cancels the deviation in the discharge direction of the ink generated by the air flow by shifting the coaxiality in advance. Therefore, since the nozzle substrate 46 according to the first embodiment can bring the ink discharge direction closer to the Z2 direction, the decrease of the quality of the image formed on the medium PP can be suppressed.

2. Second Embodiment

In the second embodiment, a case where the ink discharge direction is deviated in a direction orthogonal to the main scanning direction due to the air flow will be described.

Figure 8:
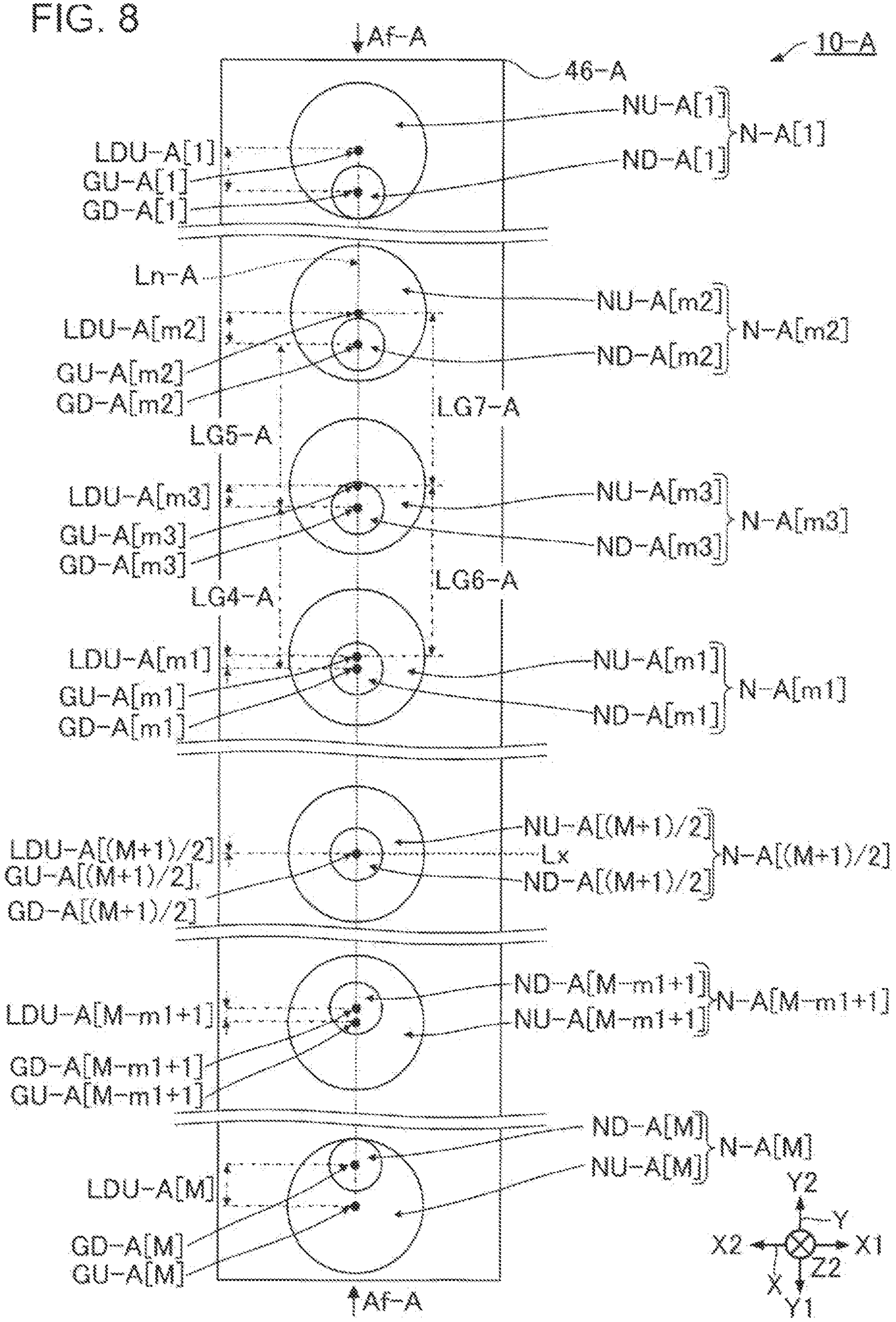
FIG. 8 is a diagram illustrating an arrangement aspect of M nozzles in a second embodiment.

FIG. 8 is a diagram illustrating an arrangement aspect of M nozzles N-A in the second embodiment. A liquid discharge head 10-A in the second embodiment differs from the liquid discharge head 10 in that a nozzle substrate 46-A is included instead of the nozzle substrate 46. The nozzle substrate 46-A differs from the nozzle substrate 46 in that the M nozzles N-A are formed instead of the M nozzles N.

In FIG. 8, similarly to FIG. 7, for convenience of explanation, M is set to an odd number of 9 or more, and the arrangement aspect of the nozzles N-A in the second embodiment will be described by representing the seven nozzles N-A as the nozzle N-A [1], the nozzle N-A [m2], the nozzle N-A [m3], the nozzle N-A [m1], the nozzle N-A [(M+1)/2], the nozzle N-A [M−m1+1], and the nozzle N-A [M] among the M nozzles N-A. m1, m2, and m3 are greater than 1 and less than (M+1)/2, and are integers for which m2+1=m3=m1−1 holds. Since M is an odd number, the nozzle N-A [(M+1)/2] is positioned at the center of a nozzle row Ln-A constituted with the M nozzles N-A. In regard to the M nozzles N-A, a distance LDU-A between a gravity center GD-A of a downstream nozzle portion ND-A and a gravity center GU-A of an upstream nozzle portion NU-A is a distance in a direction along the Y-axis that is the arrangement direction.

The M nozzles N-A differ from the M nozzles N in that the direction of the deviation of the coaxiality is the direction along the Y-axis. Further, in the direction along the Y-axis, the gravity center GD-A of the downstream nozzle portion ND-A of the nozzle N-A other than the nozzle N-A [(M+1)/2] among the M nozzles N-A is closer to the center of the nozzle row Ln-A than the gravity center GU-A of the upstream nozzle portion NU-A. The central position of the nozzle row Ln-A substantially matches the position of the gravity center GU-A [(M+1)/2] of the nozzle N-A [(M+1)/2] and the position of the gravity center GD-A [(M+1)/2].

In the second embodiment, a state is assumed in which the ink discharged from the nozzle N-A, as a distance approaches the end portion of the nozzle row Ln-A, is deviated in a direction toward the center of the nozzle row Ln-A by an air flow Af-A toward the center of the nozzle row Ln-A. Among the M nozzles N-A, the upstream nozzle portion NU-A and the downstream nozzle portion ND-A are disposed substantially linearly symmetrical with respect to the straight line Lx as an axis. As illustrated in FIG. 8, there is no deviation of the coaxiality of the nozzle N-A [(M+1)/2] positioned at the center. That is, in plan view, the distance LDU-A [(M+1)/2] between the gravity center GD-A [(M+

1)/2] of the downstream nozzle portion ND-A [(M+1)/2] and the gravity center GU-A [(M+1)/2] of the upstream nozzle portion NU-A [(M+1)/2] of the nozzle N-A [(M+1)/2] is substantially 0. On the other hand, among the M nozzles N-A, the coaxiality of the nozzle N-A other than the nozzle N-A [(M+1)/2] positioned at the center is deviated in the direction toward the center of the nozzle row Ln-A. Further, the coaxiality becomes lower as a distance to the end portion of the nozzle row Ln-A decreases.

Also in the second embodiment, similarly to the first embodiment, the coaxiality becomes monotonically lower as a distance to the end portion of the nozzle row Ln-A decreases. It will be described that the coaxiality becomes monotonically lower as a distance to the end portion of the nozzle row Ln-A decreases using the nozzle N-A [m2], the nozzle N-A [m3], and the nozzle N-A [m1]. As illustrated in FIG. 8, the nozzle N-A [m3] is positioned between the nozzle N-A [m2] and the nozzle N-A [m1]. As illustrated in FIG. 8, the distance LDU-A [m3] between the downstream nozzle portion ND-A [m3] and the upstream nozzle portion NU-A [m3] of the nozzle N-A [m3] is longer than the distance LDU-A [m1] and is shorter than the distance LDU-A [m2]. The distance LDU-A [m1] is a distance between the downstream nozzle portion ND-A [m1] and the upstream nozzle portion NU-A [m1] of the nozzle N-A [m1]. The distance LDU-A [m2] is a distance between the downstream nozzle portion ND-A [m2] and the upstream nozzle portion NU-A [m2] of the nozzle N-A [m2].

Furthermore, as can be understood from FIG. 7, also in the nozzle substrate 46-A according to the second embodiment similarly to the nozzle substrate 46 according to the first embodiment, there is a characteristic that the interval between the adjacent downstream nozzle portions ND-A is more constant than the interval between the adjacent upstream nozzle portions NU-A. Specifically, in plan view, the absolute value of the difference between the distance LG4-A and the distance LG5-A is smaller than the absolute value of the difference between the distance LG6-A and the distance LG7-A. The distance LG4-A is a distance between the gravity center GD-A [m3] and the gravity center GD-A [m1]. The distance LG5 is a distance between the gravity center GD-A [m3] and the gravity center GD-A [m2]. The distance LG6-A is a distance between the gravity center GU-A [m3] and the gravity center GU-A [m1]. The distance LG7-A is a distance between the gravity center GU-A [m3] and the gravity center GU-A [m2]. In the example of FIG. 8, the absolute value of the difference between the distance LG4-A and the distance LG5-A is substantially 0.

2-1. Summary of Second Embodiment

Hereinafter, a summary of the second embodiment will be described using the m-first nozzle N-A [m1] and the m-second nozzle N-A [m2] among the M piezoelectric elements PZ. m1 is an integer of 2 or more and (M+1)/2 or less. m2 is an integer of 1 or more and less than m1.

The distance LDU-A [m1] and the distance LDU-A [m2] are distances in the direction along the Y-axis that is the arrangement direction in which the M nozzles N-A are arranged.

The liquid discharge head 10-A according to the second embodiment can adjust the landing deviation in the direction along the Y-axis, which is the arrangement direction, and suppress the decrease of the quality of the image formed on the medium PP due to the air flow Af-A.

Further, in the arrangement direction, the gravity center GD-A of the downstream nozzle portion ND-A [m2] is closer to the center of the nozzle row Ln-A than the gravity center GU-A of the upstream nozzle portion NU-A [m2].

As illustrated in the second embodiment, the ink discharged from the nozzle N-A positioned at the end portion of the nozzle row Ln-A may be deviated by the air flow Af-A in the direction toward the center of the nozzle row Ln-A. The liquid discharge head 10-A according to the second embodiment can cause the ink to fly in a direction toward the end portion of the nozzle row Ln-A by setting the direction of the deviation in the coaxiality as a direction toward the center of the nozzle row Ln-A, and can adjust the landing deviation in the direction along the Y-axis and suppress the decrease of the quality of the image formed on the medium PP due to the air flow Af-A.

In the second embodiment as in the first embodiment, the interval between the adjacent downstream nozzle portions ND is more constant than the interval between the adjacent upstream nozzle portions NU. The liquid discharge head 10 according to the second embodiment can improve the quality of the image formed on the medium PP as compared with the aspect in which the interval between the adjacent upstream nozzle portions NU is more constant than the interval between the adjacent downstream nozzle portions ND.

3. Third Embodiment

In the third embodiment, a case where the ink discharge direction is deviated due to the air flow in a direction orthogonal to the main scanning direction and in a direction toward an end portion of the nozzle row Ln will be described.

Figure 9:
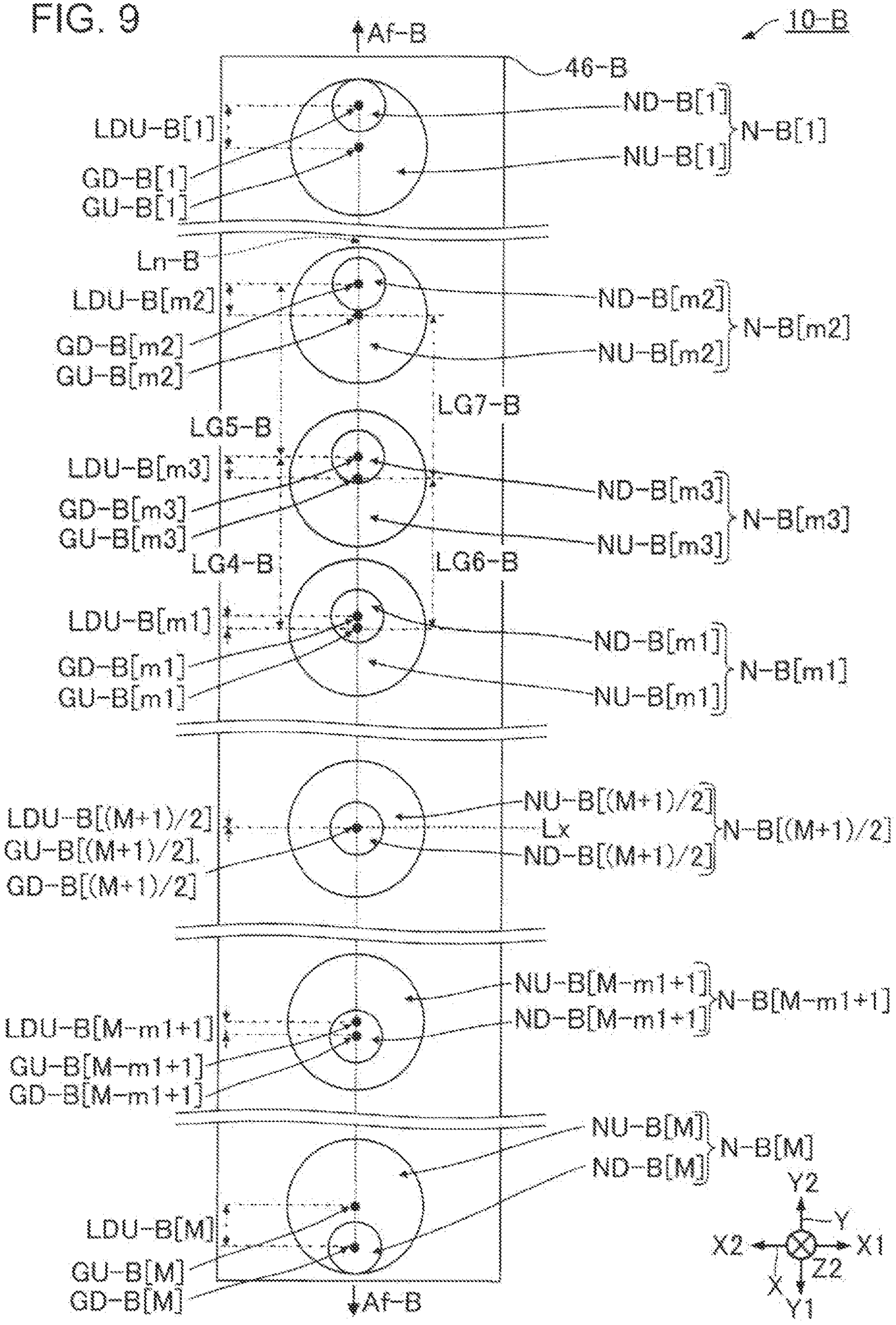
FIG. 9 is a diagram illustrating an arrangement aspect of M nozzles in a third embodiment.

FIG. 9 is a diagram illustrating an arrangement aspect of M nozzles N-B in the third embodiment. A liquid discharge head 10-B in the third embodiment differs from the liquid discharge head 10 in that a nozzle substrate 46-B is included instead of the nozzle substrate 46. The nozzle substrate 46-B differs from the nozzle substrate 46 in that the M nozzles N-B are formed instead of the M nozzles N.

In FIG. 9, similarly to FIG. 7, for convenience of explanation, M is set to an odd number of 9 or more, and the arrangement aspect of the nozzles N-B in the third embodiment will be described by representing, among the M nozzles N-B, the seven nozzles N-B as the nozzle N-B [1], the nozzle N-B [m2], the nozzle N-B [m3], the nozzle N-B [m1], the nozzle N-B [(M+1)/2], the nozzle N-B [M−m1+1], and the nozzle N-B [M]. m1, m2, and m3 are greater than 1 and less than (M+1)/2, and are integers for which m2+1=m3=m1−1 holds. Since M is an odd number, the nozzle N-B [(M+1)/2] is positioned at the center of a nozzle row Ln-B constituted with the M nozzles N-B. In regard to the M nozzles N-B, a distance LDU-B between a gravity center GD-B of a downstream nozzle portion ND-B and a gravity center GU-B of an upstream nozzle portion NU-B is a distance in the direction along the Y-axis that is the arrangement direction.

The M nozzles N-B differ from the M nozzles N in that the direction of the deviation of the coaxiality is the direction along the Y-axis. Further, in the direction along the Y-axis, the gravity center GD-B of the downstream nozzle portion ND-B of the nozzle N-B other than the nozzle N-B [(M+1)/2] positioned at the center of the M nozzles N-B is closer to the nozzles N-B at both ends of the nozzle row Ln-B than the gravity center GU-B of the upstream nozzle portion NU-B. Among the M nozzles N-B, the upstream nozzle portion NU-B and the downstream nozzle portion ND-B are disposed substantially linearly symmetrical with respect to the straight line Lx as an axis. More specifically, the gravity center GD-B of each of the downstream nozzle portions ND-B from the nozzle N-B [1] to the nozzle N-B [(M+1)/2−1] is positioned in the Y2 direction as compared with the gravity center GU-B of the upstream nozzle portion NU-B. On the other hand, the gravity center GD-B of each of the downstream nozzle portions ND-B from the nozzle N-B [(M+1)/2+1] to the nozzle N-B [M] is positioned in the Y1 direction as compared with the gravity center GU-B of the upstream nozzle portion NU-B.

In the third embodiment, a state is assumed in which the ink discharged from the nozzle N-B, as a distance approaches the end portion of the nozzle row Ln-B, is deviated in a direction toward the end portion of the nozzle row Ln-B by an air flow Af-B toward the end portion of the nozzle row Ln-B. As illustrated in FIG. 9, there is no deviation of the coaxiality of the nozzle N-B [(M+1)/2] positioned at the center. That is, in plan view, the distance LDU-B [(M+1)/2] between the gravity center GD-B [(M+1)/2] of the downstream nozzle portion ND-B [(M+1)/2] and the gravity center GU-B [(M+1)/2] of the upstream nozzle portion NU-B [(M+1)/2] of the nozzle N-B [(M+1)/2] is substantially 0. On the other hand, among the M nozzles N-B, the coaxiality of the nozzle N-B other than the nozzle N-B [(M+1)/2] positioned at the center is deviated in the direction toward the end portion of the nozzle row Ln-B. Further, the coaxiality becomes lower as a distance to the end portion of the nozzle row Ln-B decreases.

Also in the third embodiment, similarly to the first embodiment, the coaxiality becomes monotonically lower as a distance to the end portion of the nozzle row Ln-B decreases. It will be described that the coaxiality becomes monotonically lower as a distance to the end portion of the nozzle row Ln-B decreases using the nozzle N-B [m2], the nozzle N-B [m3], and the nozzle N-B [m1]. As illustrated in FIG. 9, the nozzle N-B [m3] is positioned between the nozzle N-B [m2] and the nozzle N-B [m1]. As illustrated in FIG. 9, the distance LDU-B [m3] between the downstream nozzle portion ND-B [m3] and the upstream nozzle portion NU-B [m3] of the nozzle N-B [m3] is longer than the distance LDU-B [m1] and is shorter than the distance LDU-B [m2]. The distance LDU-B [m1] is a distance between the downstream nozzle portion ND-B [m1] and the upstream nozzle portion NU-B [m1] of the nozzle N-B [m1]. The distance LDU-B [m2] is a distance between the downstream nozzle portion ND-B [m2] and the upstream nozzle portion NU-B [m2] of the nozzle N-B [m2].

Furthermore, as can be understood from FIG. 9, also in the nozzle substrate 46-B according to the third embodiment similarly to the nozzle substrate 46 according to the first embodiment, there is a characteristic that the interval between the adjacent downstream nozzle portions ND-B is more constant than the interval between the adjacent upstream nozzle portions NU-B. Specifically, in plan view, the absolute value of the difference between the distance LG4-B and the distance LG5-B is smaller than the absolute value of the difference between the distance LG6-B and the distance LG7-B. The distance LG4-B is a distance between the gravity center GD-B [m3] and the gravity center GD-B [m1]. The distance LG5 is a distance between the gravity center GD-B [m3] and the gravity center GD-B [m2]. The distance LG6-B is a distance between the gravity center GU-B [m3] and the gravity center GU-B [m1]. The distance LG7-B is a distance between the gravity center GU-B [m3] and the gravity center GU-B [m2].

3-1. Summary of Third Embodiment

Hereinafter, a summary of the third embodiment will be described using the m-first nozzle N-B [m1] and the m-second nozzle N-B [m2] among the M piezoelectric elements PZ. m1 is an integer of 2 or more and (M+1)/2 or less. m2 is an integer of 1 or more and less than m1.

In the arrangement direction, the gravity center GD-B [m2] of the downstream nozzle portion ND-B [m2] is closer to the nozzle N-B [1] than the gravity center GU [m2] of the upstream nozzle portion NU-B [m2].

As illustrated in the third embodiment, the ink discharged from the nozzle N-B positioned at the end portion of the nozzle row Ln-B may be deviated by the air flow Af-B in the direction toward the end portion of the nozzle row Ln-B. The liquid discharge head 10-B according to the third embodiment can cause the ink to fly in a direction toward the center of the nozzle row Ln-B by setting the direction of the deviation of the coaxiality as a direction toward the end portion of the nozzle row Ln-B. Therefore, the liquid discharge head 10-B according to the third embodiment can adjust the landing deviation in the direction along the Y-axis, and suppress the decrease of the quality of the image formed on the medium PP due to the air flow Af-B.

4. Fourth Embodiment

The liquid discharge apparatus 100 according to the first embodiment to the third embodiment is a serial type printing apparatus, but may be, so-called, a line type printing apparatus in which the plurality of nozzles N for discharging ink are distributed over the entire range in a width direction of the medium PP. In the fourth embodiment, a line type printing apparatus that transports the medium PP by a drum will be described.

Figure 10:
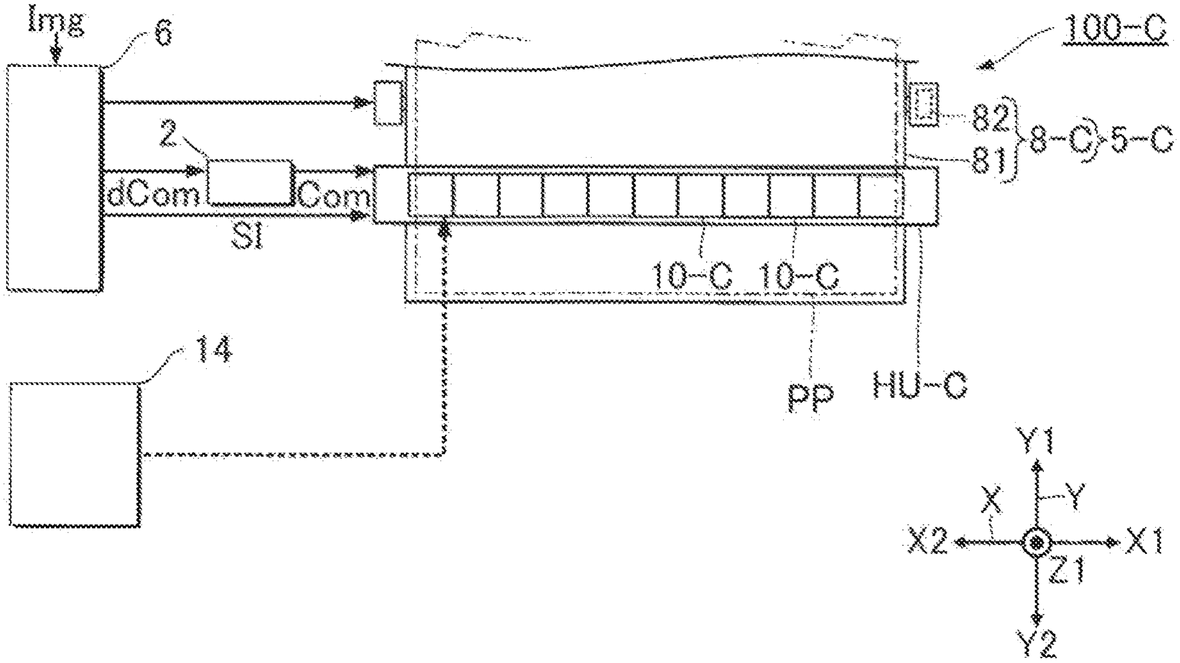
FIG. 10 is a schematic view illustrating a configuration example of a liquid discharge apparatus according to a fourth embodiment.

FIG. 10 is a schematic view illustrating a configuration example of a liquid discharge apparatus 100-C according to the fourth embodiment. The liquid discharge apparatus 100-C differs from the liquid discharge apparatus 100 in that a liquid discharge module HU-C is provided instead of the liquid discharge module HU and a movement mechanism 5-C is provided instead of the movement mechanism 5. The movement mechanism 5-C differs from the movement mechanism 5 in that the head movement mechanism 7 is not included and a transport mechanism 8-C is included instead of the transport mechanism 8.

The liquid discharge module HU-C is a line head having a plurality of liquid discharge heads 10-C disposed such that the plurality of nozzles N are distributed over the entire range of the medium PP in the direction of the X-axis. That is, the aggregate of the plurality of liquid discharge heads 10-C constitutes a long line head extending in the direction along the X-axis. When the ink discharge from the plurality of liquid discharge heads 10-C is performed in parallel with the transport of the medium PP by the transport mechanism 8-C, an image by the ink is formed on the surface of the medium PP. The plurality of nozzles N included in the one liquid discharge head 10-C may be disposed to be distributed over the entire range of the medium PP in the direction along the X-axis, and in this case, for example, the liquid discharge module HU-C is constituted with the one liquid discharge head 10-C. The liquid discharge head 10-C differs from the liquid discharge head 10 in that a nozzle substrate 46-C, which will be described later in FIG. 12, instead of the nozzle substrate 46.

Figure 11:
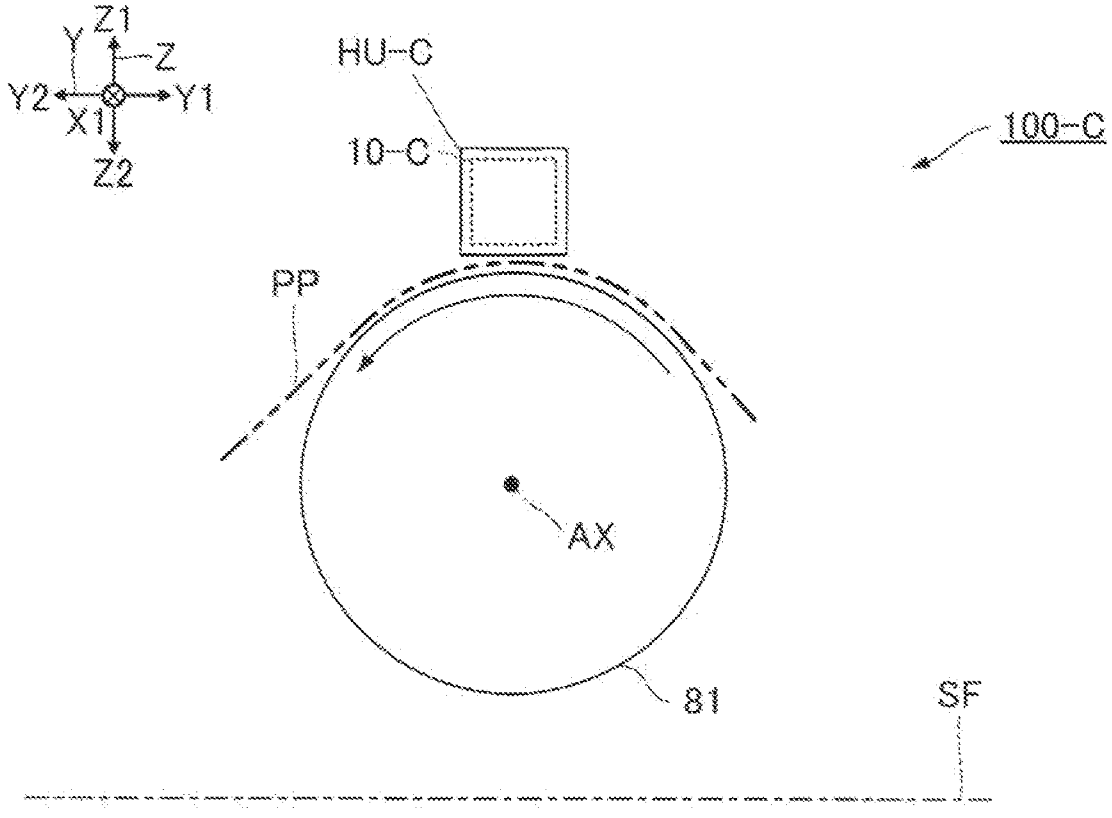
FIG. 11 is a view of the liquid discharge apparatus in an X1 direction.

The transport mechanism 8-C has a transport drum 81 that transports the medium PP in a state of being attracted to an outer peripheral surface thereof, and a drive mechanism 82 such as a motor. FIG. 11 illustrates a positional relationship between the transport drum 81 and the liquid discharge module HU-C.

FIG. 11 is a view of the liquid discharge apparatus 100-C in the X1 direction. The transport drum 81 is a tubular or cylindrical member having an outer peripheral surface along a rotation axis AX parallel to the X-axis.

The transport drum 81 is rotated around the rotation axis AX by the drive mechanism 82. In the example of FIG. 11, the transport drum 81 rotates counterclockwise when viewed in the X1 direction. The outer peripheral surface of the transport drum 81 is charged by a charger (not illustrated). The medium PP is electrostatically attracted to the outer peripheral surface of the transport drum 81 by the electrostatic force generated by the charging.

In the example of FIG. 11, the liquid discharge module HU-C is disposed to be parallel to a horizontal plane SF. For simplification of the description, in the example of FIG. 11, the liquid discharge module HU-C is disposed to be parallel to the horizontal plane SF, but may be disposed to be inclined with respect to the horizontal plane SF along the outer peripheral surface of the transport drum 81.

Figure 12:
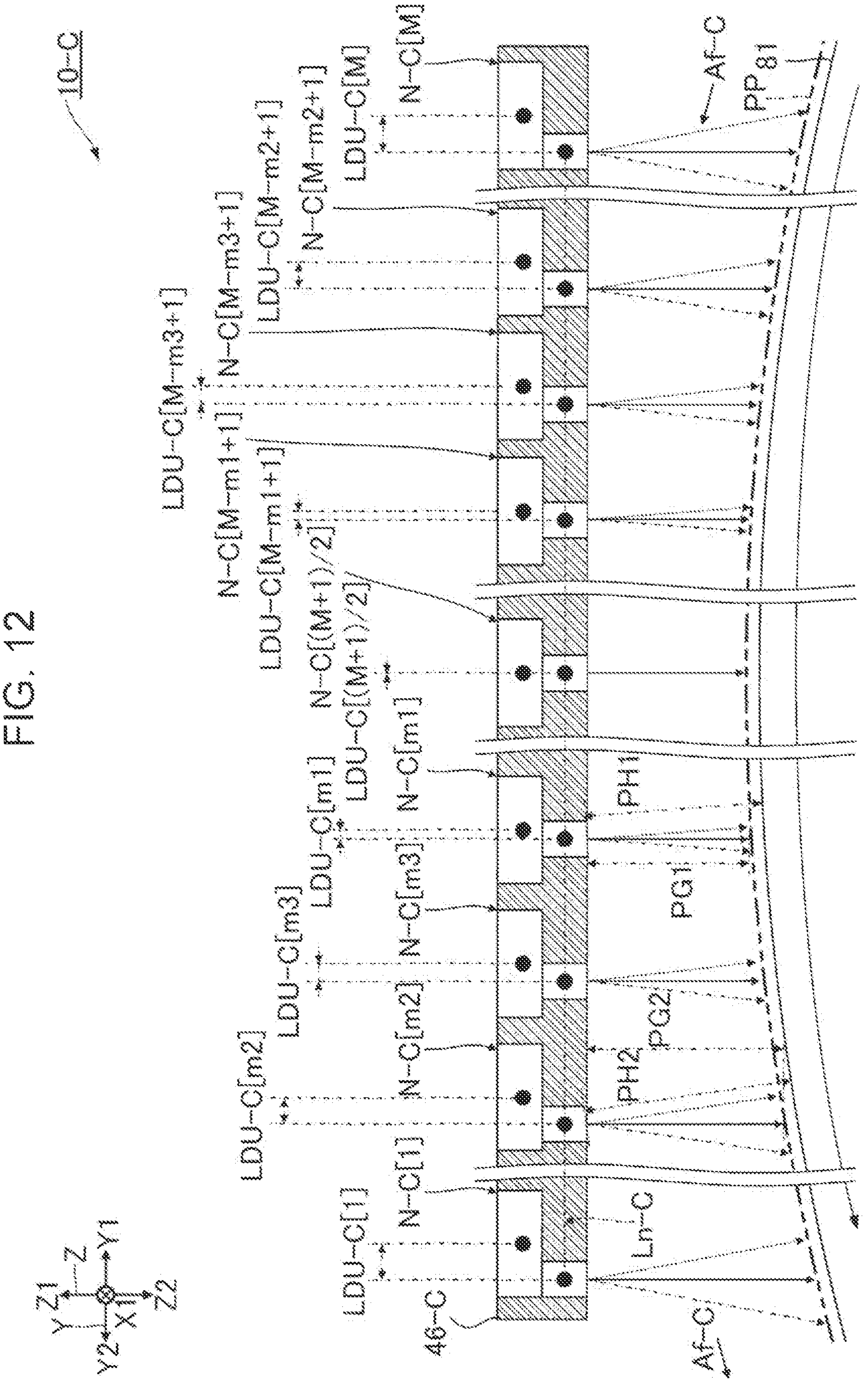
FIG. 12 is a view illustrating the vicinity of a medium in FIG. 11.

FIG. 12 is a view illustrating the vicinity of the medium PP in FIG. 11. The nozzle substrate 46-C differs from the nozzle substrate 46 in that M nozzles N-C are formed instead of the M nozzles N.

In FIG. 12, similarly to FIG. 7, for convenience of explanation, M is set to an odd number of 9 or more, and the arrangement aspect of the nozzles N-C in the fourth embodiment will be described by representing the seven nozzles N-C as the nozzle N-C [1], the nozzle N-C [m2], the nozzle N-C [m3], the nozzle N-C [m1], the nozzle N-C [(M+1)/2], the nozzle N-C [M−m1+1], and the nozzle N-C [M] among the M nozzles N-C. m1, m2, and m3 are greater than 1 and less than (M+1)/2, and are integers for which m2+1=m3=m1−1 holds. Since M is an odd number, the nozzle N-C [(M+1)/2] is positioned at the center of a nozzle row Ln-C constituted with the M nozzles N-C. In regard to the M nozzles N-C, a distance LDU-C between a gravity center GD-C of a downstream nozzle portion ND-C and a gravity center GU-C of an upstream nozzle portion NU-C is a distance in the direction along the Y-axis that is the arrangement direction.

As illustrated in FIG. 12, the nozzle substrate 46-C is a plate-shaped member parallel to the XY plane, while the transport drum 81 is a member having an outer peripheral surface along the circumference of the rotation axis AX. Therefore, the distance between each of the M nozzles N-C and the medium PP in the direction along the Z-axis is different for each of the M nozzles N-C. This is because the arrangement direction of the nozzles N-C and the rotation axis AX of the transport drum 81 are not parallel to each other. In the present embodiment, the arrangement direction of the nozzles N-C is the direction along the Y-axis, but the arrangement direction is not limited thereto and the arrangement direction of the nozzles N-C may be an optional direction as long as it is not parallel to the rotation axis AX of the transport drum 81. As can be understood from FIG. 12, among the distances between each of the M nozzles N-C and the medium PP in the direction along the Z-axis, the distance between the nozzle N-C [(M+1)/2] positioned at the center of the nozzle row Ln-C and the medium PP is the shortest, and the distance between the nozzle N-C [1] and the medium PP and the distance between the nozzle N-C [M] and the medium PP that are positioned at both ends of the nozzle row Ln-C are the longest. Therefore, in the direction along the Z-axis, a distance PG2 between the nozzle N-C [m2] and the medium PP is longer than a distance PG1 between the nozzle N-C [m1] and the medium PP. Further, a distance PH2 between the nozzle N-C [m2] and the transport drum 81 is longer than a distance PH1 between the nozzle N-C [m1] and the transport drum 81.

When the distance between the nozzle N-C and the medium PP is long, the flight distance of the discharged ink is long, and thus the influence of an air flow Af-C generated by the rotation of the transport drum 81 is large, so that the landing error is large. In the example of FIG. 12, the discharge direction is deviated in the Y2 direction due to the air flow Af-C. Therefore, in the fourth embodiment, the deviation of the coaxiality is increased as the distance between the nozzle N-C and the medium PP increases. Specifically, in the magnitude of the deviation of the coaxiality of each of the M nozzles N-C, the magnitude of the deviation of the coaxiality of the nozzle N-C [(M+1)/2] is the smallest and is 0, and the deviations of the coaxialities of the nozzle N-C [1] and the nozzle N-C [M] are the largest. The magnitude of the deviation of the coaxiality of the nozzle N-C [(M+1)/2] is the distance LDU-C [(M+1)/2], and the magnitude of the deviation of the coaxiality of the nozzle N-C [1] is the distance LDU-C [1].

FIG. 12 illustrates the orbits of the ink discharged from each of the nozzles N-C. The orbit indicated by the arrow of the one-point chain line does not have any deviation in the coaxiality, and is an orbit in which the discharge direction is deviated in the Y2 direction due to the air flow Af-C. The orbit indicated by the broken line arrow is the orbit of the ink in an aspect in which the air flow Af-C is not generated although there is a deviation in the coaxiality. The orbit indicated by the solid arrow is the orbit of the ink when the influence of the air flow Af-C is canceled out by the deviation of the coaxiality.

4-1. Summary of Fourth Embodiment

As described above, the liquid discharge apparatus 100-C according to the fourth embodiment includes the liquid discharge head 10-C, and the movement mechanism 5-C that changes a relative position between the medium PP, in which an image is formed by the landing of ink discharged from the liquid discharge head 10-C, and the liquid discharge head and the distance PG2 between the nozzle N-C [m2] and the medium PP in the direction along the Z-axis is longer than the distance PG1 between the nozzle N-C [m1] and the medium PP in the direction along the Z-axis.

The liquid discharge apparatus 100-C according to the fourth embodiment can suppress an error in the landing position in regard to each of the M nozzles N-C by correcting the deviation of the coaxiality according to each of the distances between the M nozzles N-C and the medium PP.

Further, the movement mechanism 5-C has the transport drum 81 that rotates around the rotation axis AX orthogonal to the Y-axis, which is the arrangement direction of the nozzle row Ln, and transports the medium PP. The distance PH2 between the nozzle N-C [m2] and the transport drum 81 is longer than the distance PH1 between the nozzle N-C [m1] and the transport drum 81.

Although the discharge direction is shifted by the air flow Af-C generated by the rotation of the transport drum 81, the error in the landing position can be suppressed by deviating the coaxiality.

5. Fifth Embodiment

The liquid discharge apparatus 100-C according to the fourth embodiment includes the transport drum 81 that rotates around the rotation axis AX and transports the medium PP, but is not limited thereto.

Figures 13, 14:
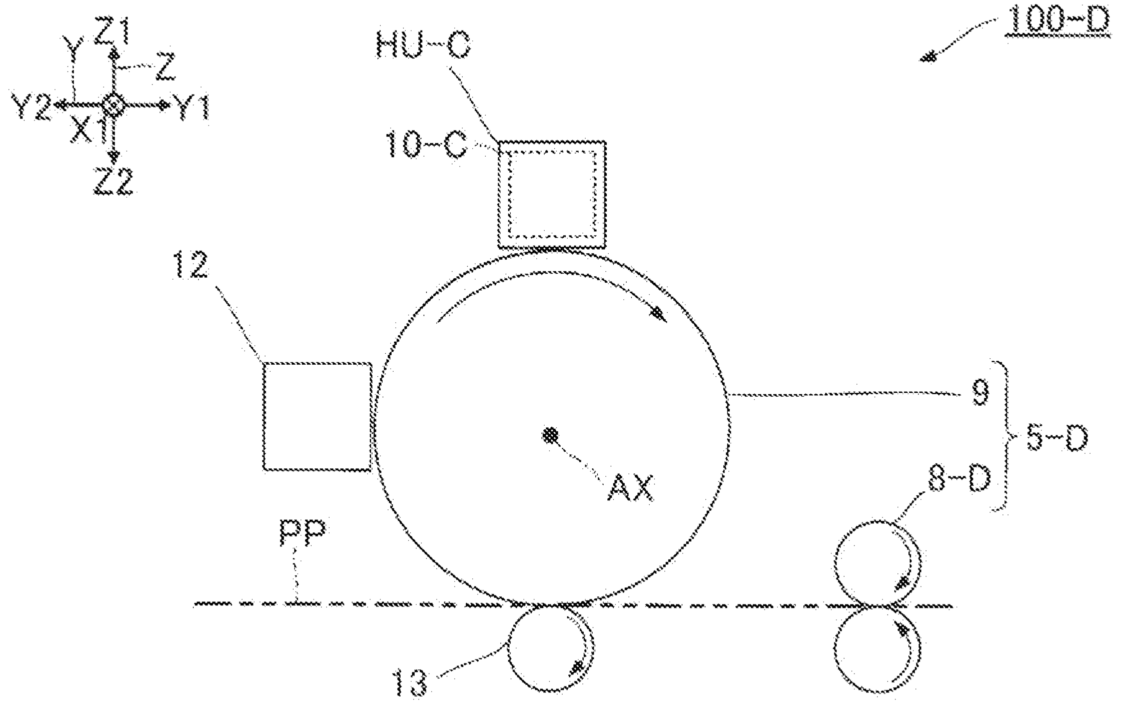
FIG. 13 is a view of a liquid discharge apparatus according to a fifth embodiment in the X1 direction.
FIG. 14 is a table illustrating an example of contents of air flow information.

FIG. 13 is a view of a liquid discharge apparatus 100-D according to the fifth embodiment in the X1 direction. The liquid discharge apparatus 100-D is a transfer type ink jet printer that performs printing on the medium PP after removing the solvent on an intermediate transfer body 9. The liquid discharge apparatus 100-D differs from the liquid discharge apparatus 100-C according to the fourth embodiment in that a movement mechanism 5-D is included instead of the movement mechanism 5-C and a reaction solution coating portion 12 and a transfer roller 13 are included. The movement mechanism 5-D changes the relative position of the intermediate transfer body 9 and the liquid discharge head 10-C. The movement mechanism 5-D differs from the movement mechanism 5-C in that a transport mechanism 8-D is included instead of the transport mechanism 8-C and the intermediate transfer body 9 is further included. Although not illustrated, the control module 6 according to the fourth embodiment controls the reaction solution coating portion 12 and the transfer roller 13 in addition to the movement mechanism 5-D and the liquid discharge module HU-C.

The transport mechanism 8-D transports the medium PP in the Y2 direction. The intermediate transfer body 9 is a member having an outer peripheral surface along the rotation axis AX. The intermediate transfer body 9 rotates around the rotation axis AX. In the example of FIG. 13, the intermediate transfer body 9 rotates clockwise when viewed in the X1 direction. The liquid discharged from the liquid discharge head 10-C lands, and the aggregated ink image formed by the landing of the ink is transferred to the medium PP. The aggregated ink image is an example of "an image formed by the landing of a liquid". The reaction solution coating portion 12, the liquid discharge module HU-C, and the transfer roller 13 are disposed along the outer peripheral surface of the intermediate transfer body 9. The reaction solution coating portion 12 coats the intermediate transfer body 9 with the reaction solution. Next, the ink discharged from the liquid discharge head 10-C included in the liquid discharge module HU-C lands on the intermediate transfer body 9, and an aggregated ink image is formed on the intermediate transfer body 9. The aggregated ink image on the intermediate transfer body 9 is pressed by the transfer roller 13 against the medium PP transported by the transport mechanism 8-D, and the aggregated ink image is transferred to the medium PP.

An air flow is generated by the rotation of the intermediate transfer body 9. Although the discharge direction is deviated by the air flow, in the fifth embodiment, similarly to the fourth embodiment, by shifting the coaxiality, an error in the landing position can be suppressed.

5-1. Summary of Fifth Embodiment

As described above, the movement mechanism 5-D according to the fifth embodiment changes the relative position between the intermediate transfer body 9, in which the ink discharged from the liquid discharge head 10-C lands, that transfers the aggregated ink image formed by the landing of the ink onto the medium PP, and the liquid discharge head 10-C. Although not illustrated in FIG. 13, the distance between the nozzle N-C [m2] and the medium PP in the direction along the Z-axis is longer than the distance between the nozzle N-C [m1] and the medium PP in the direction along the Z-axis.

The liquid discharge apparatus 100-C according to the fourth embodiment can suppress an error in the landing position in regard to each of the M nozzles N-C by correcting the deviation of the coaxiality according to each of the distances between the M nozzles N-C and the medium PP.

Further, the movement mechanism 5-D has the intermediate transfer body 9 that rotates around a rotation axis. Although not illustrated in FIG. 13, the distance between the nozzle N-C [m2] and the intermediate transfer body 9 is longer than the distance between the nozzle N-C [m1] and the intermediate transfer body 9.

The discharge direction is deviated by the air flow generated by the rotation of the intermediate transfer body 9, but the error in the landing position can be suppressed by shifting the coaxiality.

When the fourth embodiment and the fifth embodiment are included, and the movement mechanism 5 changes the relative position between the medium PP and the liquid discharge head 10, that is, in a case where the movement mechanism 5 is the movement mechanism 5-C according to the fourth embodiment, the movement mechanism 5-C has the transport drum 81 that rotates around the rotation axis AX orthogonal to the arrangement direction of the nozzle row Ln and transports the medium PP, and the distance PG2 between the nozzle N-C [m2] and the transport drum 81 is longer than the distance PG1 between the nozzle N-C [m1] and the transport drum 81. On the other hand, when the movement mechanism 5 changes the relative position between the intermediate transfer body 9 and the liquid discharge head 10, that is, in a case where the movement mechanism 5 is the movement mechanism 5-D according to the fifth embodiment, the movement mechanism 5 has the intermediate transfer body 9 rotates around the rotation axis AX, and the distance between the nozzle N-C [m2] and the intermediate transfer body 9 is longer than the distance between the nozzle N-C [m1] and the intermediate transfer body 9.

6. Modification Example

Each of the above-exemplified forms can be variously modified. A specific aspect of modification is illustrated below. Two or more aspects optionally selected from the following examples can be appropriately merged to the extent that they do not contradict each other.

6-1. First Modification Example

In the nozzle N having the deviation in the coaxiality similarly to the nozzle N in each of the above-described aspects, the discharge direction can be adjusted by adjusting the drive signal Com. The control module 6 corrects the deviation in the discharge direction by adjusting the drive signal Com. For example, when the liquid discharge head 10 is incorporated into the liquid discharge apparatus 100, the manufacturer of the liquid discharge apparatus 100 determines, in the control module 6, the drive signal Com adjusted to cancel the deviation in the discharge direction due to the air flow. The control module 6 stores the waveform designation signal dCom that generates the determined drive signal Com in the storage circuit. When the liquid discharge apparatus 100 is shipped and the user of the liquid discharge apparatus 100 instructs the execution of the print processing, the control module 6 outputs the waveform designation signal dCom stored in the storage circuit to the drive signal generation circuit 2.

When the m-first nozzle N [m1] and the m-second nozzle N [m2] are used, the control module 6 adjusts the drive signal Com [m1] supplied to the piezoelectric element PZ [m1] based on air flow information AI [m1] indicating an angle at which the discharge direction of the ink discharged from the nozzle N [m1] is deviated by the air flow and the distance LDU [m1], and adjusts the drive signal Com [m2] supplied to the piezoelectric element PZ [m2] based on air flow information AI [m2] indicating an angle at which the discharge direction of the ink discharged from the nozzle N [m1] is deviated by the air flow and the distance LDU [m2]. The drive signal Com [m1] is an example of a "first drive signal", and the drive signal Com [m2] is an example of a "second drive signal". The air flow information AI [m1] is an example of "first air flow information", and the air flow information AI [m2] is an example of "second air flow information". An example of the air flow information AI will be described with reference to FIG. 14.

FIG. 14 is a table illustrating an example of contents of the air flow information AI. The air flow information AI indicates an angle at which the ink discharge direction is deviated by the air flow for each nozzle N. For example, the air flow information AI [1] indicates that the discharge direction of the ink discharged from the nozzle N [1] is deviated by θA1 degrees from the Z2 direction due to the air flow. The air flow information AI [2] indicates that the discharge direction of the ink discharged from the nozzle N [2] is deviated by θA2 degrees from the Z2 direction due to the air flow. The magnitude of θA1 degrees is larger than the magnitude of θA2 degrees. The value indicated by the air flow information AI is, for example, a value obtained by an experiment or a simulation by the manufacturer of the liquid discharge apparatus 100.

As a specific adjustment method of the drive signal Com, there are the following two adjustment methods illustrated below.

In the first adjustment method, the control module 6 determines the length of the period Pwh1 of the holding element DC3 illustrated in FIG. 4 in a discharge waveform PX included in the drive signal Com based on the air flow information AI and the distance LDU, that is, holding period information TP with respect to the magnitude of the deviation of the coaxiality. The holding period information TP indicates the relationship between the length of the period Pwh1 of the holding element DC3 and the angle at which the direction in which the ink is discharged from the nozzle N is deviated. It was obtained in the experiments that the discharge direction of the ink changes when the length of the period Pwh1 is changed. The characteristics of the change in the discharge direction according to the length of the period Pwh1 will be described with reference to FIG. 15.

Figure 15:
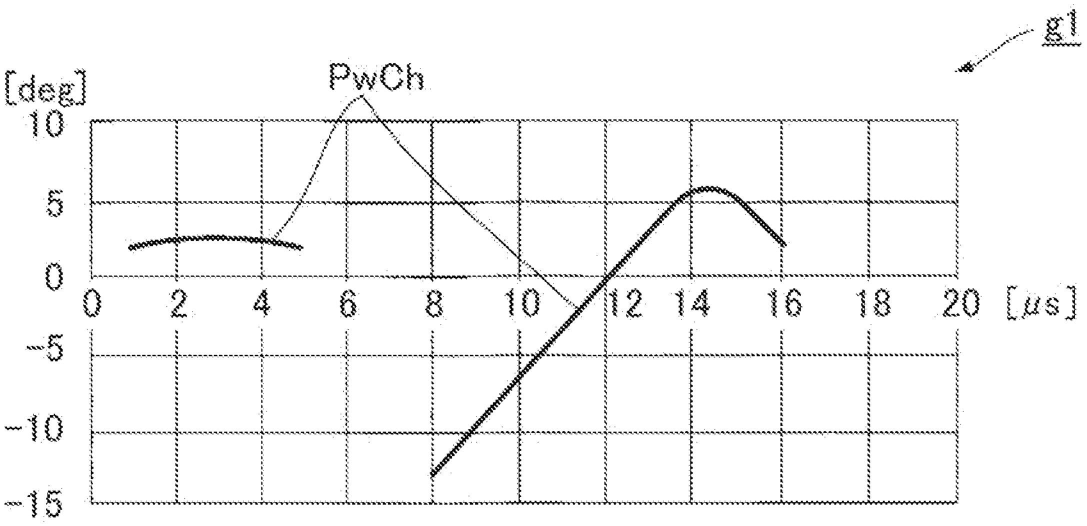
FIG. 15 is a graph for explaining a characteristic of a change in a discharge direction of ink according to a length of a period.

FIG. 15 is a graph for explaining a characteristic of a change in a discharge direction of ink according to a length of the period Pwh1. A graph g1 illustrated in FIG. 15 and a graph g2 illustrated in FIG. 17 described later illustrate the characteristics of the change in the discharge direction when the diameter of the downstream nozzle portion ND is 20 μm, the diameter of the upstream nozzle portion NU is 45 μm, the magnitude of the deviation of the coaxiality is 8 μm, and the direction of the deviation of the coaxiality is the X1 direction. The horizontal axis of the graph g1 indicates the length of the period Pwh1. The vertical axis of the graph g1 indicates an angle θ in the discharge direction. When the angle θ is a negative value, it means that the discharge direction is deviated in the X2 direction, and when the angle θ is a positive value, it means that the discharge direction is deviated in the X1 direction.

A discharge direction characteristic PwCh illustrated in FIG. 15 indicates the characteristic of the discharge direction of the ink according to the length of the period Pwh1. As the discharge direction characteristic PwCh indicates, the angle θ in the discharge direction is substantially +2.5 degrees when the length of the period Pwh1 is from substantially 1 μs to substantially 5 μs. [μs] means microseconds. [deg] illustrated in FIG. 15 means an angle represented by the degree measurement system. When the length of the period Pwh1 is from substantially 8 μs to substantially 14 μs, the angle θ in the discharge direction increases substantially linearly from substantially −13 degrees to +6 degrees. When the length of the period Pwh1 is from substantially 14 μs to substantially 16 μs, the angle θ in the discharge direction monotonically is reduced from +6 degrees to substantially +2 degrees. It means that the ink is not discharged during the period Pwh1 from substantially 5 μs to substantially 8 μs. Although the period Pwh1 is changed, the ink amount discharged from the nozzle N can be regarded as the same.

The control module 6 stores information indicating the magnitude of the deviation of the coaxiality of each of the M nozzles N, the air flow information AI of each of the M nozzles N, and a holding period characteristic table T1 indicating the characteristics of the discharge direction of the ink according to the magnitude of the deviation of the coaxiality and the length of the period Pwh1, in the storage circuit. The information indicating the magnitude of the deviation of the coaxiality of each of the M nozzles N and the holding period characteristic table T1 are, for example, values obtained by an experiment by the manufacturer of the liquid discharge head 10. An example of the holding period characteristic table T1 will be described with reference to FIG. 16.

FIG. 16 is a table illustrating an example of contents of the holding period characteristic table T1. The holding period characteristic table T1 illustrated in FIG. 16 has the holding period information TP for each magnitude of the deviation in the coaxiality. The one holding period information TP indicates the relationship between the length of the period Pwh1 and the angle θ in the discharge direction of the ink, in regard to the magnitude of the deviation of one coaxiality. The content of the holding period characteristic table T1 is determined by the manufacturer and the like of the liquid discharge head 10 based on the discharge direction characteristic PwCh illustrated in FIG. 15. For simplification of the description, FIG. 16 illustrates holding period information TP1 when the magnitude of the deviation of the coaxiality is −6 μm, holding period information TP2 when the magnitude of the deviation of the coaxiality is −8 μm, and holding period information TP3 when the magnitude of the deviation of the coaxiality is −10 μm.

When the drive signal Com is adjusted, the control module 6 refers to the holding period information TP corresponding to the magnitude of the deviation of the coaxiality of the nozzle N [m1] from the holding period characteristic table T1, and determines the length of the period Pwh1 that can be set in the Z1 direction by canceling the discharge direction deviated by the air flow, which the air flow information AI [m] indicates. For example, it is assumed that the air flow information AI [m1] indicates that the ink discharged from the nozzle N [m1] is tilted by +7 degrees in the X1 direction. Then, it is assumed that the magnitude of the deviation of the coaxiality of the nozzle N [m1] is −8 μm. The control module 6 refers to the holding period information TP2 in which the magnitude of the deviation of the coaxiality is −8 degrees in the holding period characteristic table T1, and determines the length of the period Pwh1 that can cancel the deviation in the discharge direction due to the air flow as 10 μs in which the discharge direction is tilted by −7 degrees in the X1 direction, in other words, by 7 degrees in the X2 direction. The control module 6 stores, in the storage circuit, the waveform designation signal dCom instructing to generate the drive signal Com in which the length of the period Pwh1 is 10 μs. When the print processing is executed, the control module 6 outputs the waveform designation signal dCom stored in the storage circuit to the drive signal generation circuit 2. The drive signal generation circuit 2 generates the drive signal Com in which the length of the period Pwh1 is 10 μs, and supplies the generated drive signal Com to the piezoelectric element PZ [m1].

When the drive signal Com other than the drive signal Com in which the length of the period Pwh1 is 10 μs is supplied to the piezoelectric element PZ [m2] other than the piezoelectric element PZ [m1] among the M piezoelectric elements PZ, for example, the drive signal Com may have signals of a plurality of systems. In the following description, a case where the drive signal Com has two systems of signals of a drive signal Com-A and a drive signal Com-B will be described as an example. The control module 6 stores the waveform designation signal dCom that instructs the generation of the drive signal Com-A in which the length of the period Pwh1 is 10 μs and the drive signal Com-B in which the length of the period Pwh1 is a period other than 10 μs, in the storage circuit. The drive signal Com-A corresponds to the drive signal Com [m1], and the drive signal Com-B corresponds to the drive signal Com [m2]. When the print processing is executed, the control module 6 outputs the waveform designation signal dCom stored in the storage circuit to the drive signal generation circuit 2. The drive signal generation circuit 2 generates the drive signal Com-A in which the length of the period Pwh1 is 10 μs and the drive signal Com-B in which the length of the period Pwh1 is a period other than 10 μs, and supplies the drive signals Com-A and Com-B to the liquid discharge head 10. Further, the control module 6 transmits the print signal SI instructing that the drive signal Com-A is supplied to the piezoelectric element PZ [m1] and the drive signal Com-B is supplied to the piezoelectric element PZ [m2], to the liquid discharge head 10. The drive circuit 51 of the liquid discharge head 10 supplies the drive signal Com-A to the piezoelectric element PZ [m1] based on the print signal SI, and supplies the drive signal Com-B to the piezoelectric element PZ [m2] based on the print signal SI.

The expansion element DC2 included in the discharge waveform PX of the drive signal Com-A is an example of the "expansion element". The holding element DC3 included in the discharge waveform PX of the drive signal Com-A is an example of the "holding element". The contraction element DC4 included in the discharge waveform PX of the drive signal Com-A is an example of the "contraction element". The holding potential Vc1 of the holding element DC3 is an example of the "holding potential".

In the first adjustment method, the control module 6 may store information indicating the magnitude of the deviation in the coaxiality of each of the M nozzles N, the air flow information AI in each of the M nozzles N, and a function that outputs the length of the period Pwh1 by inputting the magnitude of the deviation of the coaxiality and the angle in the discharge direction of the ink, in the storage circuit.

In the second adjustment method, the control module 6 determines the holding potential Vc1 illustrated in FIG. 4 in the discharge waveform PX that the drive signal Com has based on the air flow information AI and holding potential information TV in the distance LDU. The holding potential information TV illustrates the relationship between the holding potential Vc1 and an angle at which the direction in which the ink is discharged from the nozzle N is deviated. It was obtained in the experiments that the discharge direction of the ink changes when the holding potential Vc1 is changed. Since the ink discharge rate changes when the holding potential Vc1 is changed, it is preferable to change the holding potential Vc1 and change the holding potential Vc2 to maintain the ink discharge rate. In the following description, the holding potential information TV illustrates the relationship between the holding potential Vc1, the holding potential Vc2, and an angle at which the direction in which the ink is discharged from the nozzle N is deviated. The characteristics of the discharge direction of the ink corresponding to the holding potential Vc1 and the holding potential Vc2 will be described with reference to FIG. 17. The holding potential Vc1 and the holding potential Vc2 illustrated in FIG. 17 will be described assuming that the minimum potential that can be supplied to the piezoelectric element PZ is 0% and the maximum potential that can be supplied to the piezoelectric element PZ is 100%.

Figure 17:
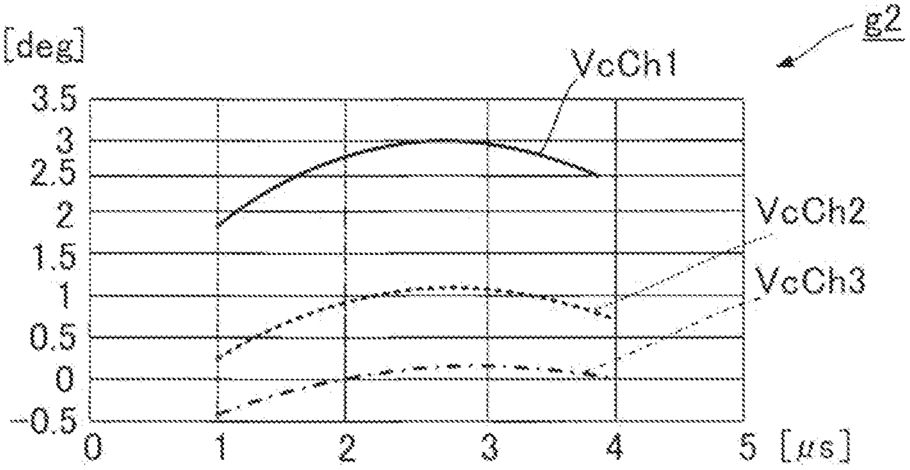
FIG. 17 is a graph for explaining a characteristic of a change in a discharge direction according to holding potentials.

FIG. 17 is a graph for explaining a characteristic of a change in a discharge direction according to the holding potential Vc1 and the holding potential Vc2. The horizontal axis of the graph g2 indicates the length of the period Pwh1. The vertical axis of the graph g2 indicates the angle θ in the discharge direction. When the angle θ is a negative value, it means that the discharge direction is deviated in the X2 direction, and when the angle θ is a positive value, it means that the discharge direction is deviated in the X1 direction.

The ink discharge rate in each of a discharge direction characteristic VcCh1, a discharge direction characteristic VcCh2, and a discharge direction characteristic VcCh3 illustrated in FIG. 17 is substantially the same discharge rate. The discharge direction characteristic VcCh1 illustrated in FIG. 17 illustrates the characteristics of the discharge direction of the ink when the holding potential Vc1 is 10% and the holding potential Vc2 is 60%. The discharge direction characteristic VcCh2 illustrated in FIG. 17 illustrates the characteristics of the discharge direction of the ink when the holding potential Vc1 is 14% and the holding potential Vc2 is 79%. The discharge direction characteristic VcCh3 illustrated in FIG. 17 illustrates the characteristics of the discharge direction of the ink when the holding potential Vc1 is 18% and the holding potential Vc2 is 100%.

As understood from each of the discharge direction characteristic VcCh1, the discharge direction characteristic VcCh2, and the discharge direction characteristic VcCh3, the magnitude of the deviation of the discharge direction tends to decrease as the holding potential Vc1 increases. The reason why the deviation magnitude of the discharge direction becomes smaller as the holding potential Vc1 increases is that the higher holding potential Vc1 means that the holding potential Vc1 approaches the reference potential Vm. It is considered that this is because, when the holding potential Vc1 approaches the reference potential Vm, the force for pulling the meniscus in the Z1 direction becomes small, it becomes difficult for the meniscus to reach the upstream nozzle portion NU, and the influence of the deviation of the coaxiality becomes small.

The control module 6 stores the information indicating the magnitude of the deviation of the coaxiality of each of the M nozzles N, and a holding potential characteristic table T2 indicating the characteristics of the discharge direction of the ink corresponding to the magnitude of the deviation of the coaxiality, the holding potential Vc1, and the holding potential Vc2 in the storage circuit. An example of the holding potential characteristic table T2 will be described with reference to FIG. 18.

FIG. 18 is a table illustrating an example of contents of the holding potential characteristic table T2. The holding potential characteristic table T2 illustrated in FIG. 18 has the period Pwh1 of 2 μs and has the holding potential information TV for each magnitude of the deviation of the coaxiality. The one holding potential information TV illustrates the relationship among the holding potential Vc1 and the holding potential Vc2, and the angle θ in the discharge direction of the ink in regard to the magnitude of the deviation of one coaxiality. For simplification of the description, FIG. 18 illustrates holding potential information TV1 when the magnitude of the deviation of the coaxiality is −6 μm, holding potential information TV2 when the magnitude of the deviation of the coaxiality is −8 μm, and holding potential information TV3 when the magnitude of the deviation of the coaxiality is −10 μm.

When the drive signal Com is adjusted, the control module 6 refers to the holding potential information TV corresponding to the magnitude of the deviation of the coaxiality of the nozzle N [m1] from the holding potential characteristic table T2, and determines the holding potential Vc1 and the holding potential Vc2 that can cancel the discharge direction deviated by the air flow, which the air flow information AI [m] indicates. For example, it is assumed that the air flow information AI [m1] indicates that the ink discharged from the nozzle N [m1] is tilted by 2.8 degrees in the X2 direction. Then, it is assumed that the magnitude of the deviation of the coaxiality of the nozzle N [m1] is −8 μm. The control module 6 refers to the holding potential information TV2 in which the magnitude of the deviation of the coaxiality is −8 degrees in the holding period characteristic table T1, and determines each of the holding potential Vc1 and the holding potential Vc2 that can cancel the deviation in the discharge direction due to the air flow such that the discharge direction is tilted by 2.8 degrees in the X1 direction (10%, 60%). The control module 6 stores, in the storage circuit, the waveform designation signal dCom instructing to generate the drive signal Com having the holding potential Vc1 of 10% and the holding potential Vc2 of 60%. When the print processing is executed, the control module 6 outputs the waveform designation signal dCom stored in the storage circuit to the drive signal generation circuit 2.

As described above, in the liquid discharge apparatus 100 according to the first modification example, the piezoelectric element PZ [m1] is driven according to the supply of the drive signal Com-A. The piezoelectric element PZ [m2] is driven according to the supply of the drive signal Com-B. The liquid discharge apparatus 100 according to the first modification example includes the liquid discharge head 10, and the control module 6 that controls the piezoelectric element PZ [m1] and the piezoelectric element PZ [m2], and the control module 6 adjusts the drive signal Com-A based on the air flow information AI [m1] and the distance LDU [m1] and adjusts the drive signal Com-B based on the air flow information AI [m2] and the distance LDU [m2].

The liquid discharge apparatus 100 according to the first modification example can adjust the discharge direction according to the air flow information AI and the distance LDU. Therefore, although the discharge direction is deviated due to the air flow, the liquid discharge apparatus 100 according to the first modification example can cancel the deviation in the discharge direction due to the air flow by adjusting the drive signal Com, and thus can improve the image quality formed on the medium PP.

Further, in the first adjustment method, the drive signal Com-A includes the expansion element DC2 that changes a potential to expand the volume of the pressure chamber CV [m1], the contraction element DC4 that changes a potential to contract the volume of the pressure chamber CV [m1], and the holding element DC3 that holds a potential constant between the expansion element DC2 and the contraction element DC4, and the control module 6 changes the drive signal Com-A by adjusting the length of the period Pwh1 of the holding element DC3 based on the holding period information TP in the distance LDU [m2] and the air flow information AI [m1].

The liquid discharge apparatus 100 according to the first modification example can adjust the drive signal Com-A such that the discharge direction due to the air flow is canceled out by changing the length of the period Pwh1.

Further, in the second adjustment method, the holding element DC3 holds a potential at the holding potential Vc1, and the control module 6 adjusts the drive signal Com-A by changing the holding potential Vc1 based on the holding potential information TV in the distance LDU [m1] and the air flow information AI [m1].

The liquid discharge apparatus 100 according to the first modification example can adjust the drive signal Com-A such that the discharge direction due to the air flow is canceled out by changing the holding potential Vc1.

6-2. Second Modification Example

In each of the above aspects, the interval between the adjacent downstream nozzle portions ND is more constant than the interval between the adjacent upstream nozzle portions NU, but the interval between the adjacent upstream nozzle portions NU may be more constant than the interval between the adjacent downstream nozzle portions ND.

6-3. Third Modification Example

In the fourth embodiment, and in the first modification example and the second modification example based on the fourth embodiment, the transport drum 81 is rotated around the rotation axis AX orthogonal to the Y-axis that is the arrangement direction of the nozzle row Ln, but may rotate around a rotation axis intersecting the Y-axis that is the arrangement direction of the nozzle row Ln. In the third modification example, the direction of the deviation of the coaxiality is a direction orthogonal to the rotation axis in the third modification example and a direction intersecting the Y-axis. In the fifth embodiment and similarly to the first modification example and the second modification example based on the fifth embodiment, the intermediate transfer body 9 may rotate around a rotation axis intersecting the Y-axis that is the arrangement direction of the nozzle row Ln.

6-4. Fourth Modification Example

In the first embodiment, the direction of the deviation of the coaxiality is the direction along the X-axis, and in the second embodiment and the third embodiment, the direction of the deviation of the coaxiality is the direction along the Y-axis, but the direction of the deviation of the coaxiality is not limited to the direction along the X-axis and the direction along the Y-axis. There may be a case where the air flow generated during the print processing is directed in a direction intersecting the X-axis and the Y-axis. In the liquid discharge head 10 according to the fourth modification example, by setting the direction of the deviation of the coaxiality as the direction intersecting the X-axis and the Y-axis, the deviation in the discharge direction due to the air flow toward the direction intersecting the X-axis and the Y-axis can be canceled.

What is claimed is:

1. A liquid discharge head comprising:

a first driving element;

a second driving element;

a third driving element;

a first pressure chamber that is partitioned on a pressure chamber substrate and imparts pressure to liquid by driving the first driving element;

a second pressure chamber that is partitioned on the pressure chamber substrate and imparts pressure to liquid by driving the second driving element;

a third pressure chamber that is partitioned on the pressure chamber substrate and imparts pressure to liquid by driving the third driving element;

a first nozzle that is one of a plurality of nozzles included in a nozzle row formed on a nozzle substrate and communicates with the first pressure chamber;

a second nozzle that is one of the plurality of nozzles and communicates with the second pressure chamber; and a third nozzle that is one of the plurality of nozzles, is positioned between the first nozzle and the second nozzle in an arrangement direction in which the plurality of nozzles are arranged, and communicates with the third pressure chamber, wherein the first nozzle is positioned closer to a center of the nozzle row than the second nozzle, the second nozzle is positioned closer to an end of the nozzle row than the first nozzle, the nozzle substrate has a discharge surface positioned opposite to the pressure chamber substrate, the first nozzle includes a first downstream nozzle portion opened on the discharge surface and a first upstream nozzle portion of which a cross-sectional area is larger than a cross-sectional area of the first downstream nozzle portion when viewed in a thickness direction of the nozzle substrate and that is positioned upstream of the first downstream nozzle portion, the second nozzle includes a second downstream nozzle portion opened on the discharge surface and a second upstream nozzle portion of which a cross-sectional area is larger than a cross-sectional area of the second downstream nozzle portion when viewed in the thickness direction and that is positioned upstream of the second downstream nozzle portion, in a case where, when viewed in the thickness direction, a distance between a gravity center position of the first downstream nozzle portion and a gravity center position of the first upstream nozzle portion is set as a first distance, and, when viewed in the thickness direction, a distance between a gravity center position of the second downstream nozzle portion and a gravity center position of the second upstream nozzle portion is set as a second distance, the second distance is longer than the first distance, the third nozzle includes:

a third downstream nozzle portion opened on the discharge surface; and a third upstream nozzle portion of which a cross-sectional area is larger than a cross-sectional area of the third downstream nozzle portion when viewed in the thickness direction and that is positioned upstream of the third downstream nozzle portion, in a case where, when viewed in the thickness direction, a distance between a gravity center position of the third downstream nozzle portion and a gravity center position of the third upstream nozzle portion is set as a third distance, the third distance is longer than the first distance and shorter than the second distance, the first nozzle is positioned next to the third nozzle, the second nozzle is positioned next to the third nozzle and is positioned in a direction opposite to a direction from the third nozzle to the first nozzle, and in a case where, when viewed in the thickness direction, a distance between the gravity center position of the third downstream nozzle portion and the gravity center position of the first downstream nozzle portion is set as a fourth distance, a distance between the gravity center position of the third downstream nozzle portion and the gravity center position of the second downstream nozzle portion is set as a fifth distance, a distance between the gravity center position of the third upstream nozzle portion and the gravity center position of the first upstream nozzle portion is set as a sixth distance, and a distance between the gravity center position of the third upstream nozzle portion and the gravity center position of the second upstream nozzle portion is set as a seventh distance, and an absolute value of a difference between the fourth distance and the fifth distance is smaller than an absolute value of a difference between the sixth distance and the seventh distance.

2. The liquid discharge head according to claim 1, wherein the first distance and the second distance are distances in a direction orthogonal to an arrangement direction in which the plurality of nozzles are arranged.

3. The liquid discharge head according to claim 1, wherein the first distance and the second distance are distances in an arrangement direction in which the plurality of nozzles are arranged.

4. The liquid discharge head according to claim 3, wherein in the arrangement direction, a gravity center of the second downstream nozzle portion is closer to the center of the nozzle row than a gravity center of the second upstream nozzle portion.

5. The liquid discharge head according to claim 3, wherein in the arrangement direction, a gravity center of the second downstream nozzle portion is closer to the end of the nozzle row than a gravity center of the second upstream nozzle portion.

6. A liquid discharge apparatus comprising:

the liquid discharge head according to claim 1; and a movement mechanism that changes a relative position between a medium in which an image is formed by landing of liquid discharged from the liquid discharge head or an intermediate transfer body, on which the liquid discharged from the liquid discharge head lands, that transfers an image formed by landing of the liquid onto the medium, and the liquid discharge head, wherein a distance between the second nozzle and the medium or the intermediate transfer body in the thickness direction is longer than a distance between the first nozzle and the medium or the intermediate transfer body in the thickness direction.

7. The liquid discharge apparatus according to claim 6, wherein the movement mechanism changes the relative position between the medium and the liquid discharge head, the movement mechanism has a transport drum that rotates around a rotation axis intersecting an arrangement direction of the nozzle row and transports the medium, a distance between the second nozzle and the transport drum is longer than a distance between the first nozzle and the transport drum.

8. The liquid discharge apparatus according to claim 6, wherein the movement mechanism changes the relative position between the intermediate transfer body and the liquid discharge head, the movement mechanism has the intermediate transfer body that rotates around the rotation axis, and a distance between the second nozzle and the intermediate transfer body is longer than a distance between the first nozzle and the intermediate transfer body.

9. The liquid discharge apparatus according to claim 8, wherein the first drive signal includes an expansion element that changes a potential such that a volume of the first pressure chamber expands, a contraction element that changes a potential such that the volume of the first pressure chamber contracts, and a holding element that holds a potential between the expansion element and the contraction element, and the control portion adjusts the first drive signal by changing a length of a period of the holding element based on holding period information indicating a relationship between the length of the period of the holding element and an angle at which a direction in which liquid is discharged from the first nozzle is deviated, and the first air flow information.

10. The liquid discharge apparatus according to claim 8, wherein the first drive signal includes an expansion element that changes a potential such that a volume of the first pressure chamber expands, a contraction element that changes a potential such that the volume of the first pressure chamber contracts, and a holding element that holds a potential between the expansion element and the contraction element at a holding potential, and the control portion adjusts the first drive signal by changing the holding potential based on holding potential information indicating a relationship between the holding potential and an angle at which a direction in which liquid is discharged from the first nozzle is deviated, and the first air flow information.

11. A liquid discharge apparatus comprising:

the liquid discharge head according to claim 1 in which the first driving element is a first piezoelectric element that is driven according to a supply of a first drive signal, and the second driving element is a second piezoelectric element that is driven according to a supply of a second drive signal; and a control portion that controls the first piezoelectric element and the second piezoelectric element, wherein the control portion adjusts the first drive signal based on first air flow information indicating an angle at which a direction in which liquid discharged from the first nozzle is discharged is deviated by air flow and the first distance, and adjusts the second drive signal based on second air flow information indicating an angle at which a direction in which liquid discharged from the second nozzle is discharged is deviated by air flow and the second distance.

12. A nozzle substrate having a nozzle row constituted with a plurality of nozzles from which liquid is discharged, comprising:

a first nozzle that is one of the plurality of nozzles; and a second nozzle that is one of the plurality of nozzles, wherein the first nozzle includes a first downstream nozzle portion opened on a discharge surface of the nozzle substrate and a first upstream nozzle portion of which a cross-sectional area is larger than a cross-sectional area of the first downstream nozzle portion when viewed in a thickness direction of the nozzle substrate and that is positioned upstream of the first downstream nozzle portion, the second nozzle includes a second downstream nozzle portion opened on the discharge surface and a second upstream nozzle portion of which a cross-sectional area is larger than a cross-sectional area of the second downstream nozzle portion when viewed in the thickness direction and that is positioned upstream of the second downstream nozzle portion, the first nozzle is positioned at a center of the nozzle row, the second nozzle is positioned at an end of the nozzle row all nozzles positioned between the first nozzle and the second nozzle in an arrangement direction in which the plurality of nozzles are arranged, each includes a downstream nozzle portion opened on a discharge surface of the nozzle substrate and an upstream nozzle portion of which a cross-sectional area is larger than a cross-sectional area of the downstream nozzle portion when viewed in a thickness direction of the nozzle substrate and that is positioned upstream of the downstream nozzle portion, in a case where, when viewed in the thickness direction, a distance between a gravity center position of the first downstream nozzle portion and a gravity center position of the first upstream nozzle portion is set as a first distance, when viewed in the thickness direction, a distance between a gravity center position of the second downstream nozzle portion and a gravity center position of the second upstream nozzle portion is set as a second distance, when viewed in the thickness direction, for each of the nozzles between the first nozzle and the second nozzle, a distance between a respective gravity center position of the downstream nozzle portion and a respective gravity center position of the upstream nozzle portion is set as an eighth distance, the eighth distance for all nozzles positioned between the first nozzle and the second nozzle in the arrangement direction is longer than the first distance and shorter than the second distance, and the eighth distance is distance in an arrangement direction in which the plurality of nozzles is arranged.

13. The nozzle substrate according to claim 12, wherein the eighth distance for all the plurality of nozzles become monotonically longer as a distance from a center of the nozzle row increases.

14. A liquid discharge head comprising:

a first driving element;

a second driving element;

a first pressure chamber that is partitioned on a pressure chamber substrate and imparts pressure to liquid by driving the first driving element;

a second pressure chamber that is partitioned on the pressure chamber substrate and imparts pressure to liquid by driving the second driving element;

a first nozzle that is one of a plurality of nozzles included in a nozzle row formed on a nozzle substrate and communicates with the first pressure chamber; and a second nozzle that is one of the plurality of nozzles and communicates with the second pressure chamber, wherein the first nozzle is positioned closer to a center of the nozzle row than the second nozzle, the second nozzle is positioned closer to an end of the nozzle row than the first nozzle, the nozzle substrate has a discharge surface positioned opposite to the pressure chamber substrate, the first nozzle includes a first downstream nozzle portion opened on the discharge surface and a first upstream nozzle portion of which a cross-sectional area is larger than a cross-sectional area of the first downstream nozzle portion when viewed in a thickness direction of the nozzle substrate and that is positioned upstream of the first downstream nozzle portion, the second nozzle includes a second downstream nozzle portion opened on the discharge surface and a second upstream nozzle portion of which a cross-sectional area is larger than a cross-sectional area of the second downstream nozzle portion when viewed in the thickness direction and that is positioned upstream of the second downstream nozzle portion, in a case where, when viewed in the thickness direction, a distance between a gravity center position of the first downstream nozzle portion and a gravity center position of the first upstream nozzle portion is set as a first distance, and, when viewed in the thickness direction, a distance between a gravity center position of the second downstream nozzle portion and a gravity center position of the second upstream nozzle portion is set as a second distance, the second distance is longer than the first distance, the first distance and the second distance are distances in an arrangement direction in which the plurality of nozzles are arranged, and in the arrangement direction, a gravity center of the second downstream nozzle portion is closer to the center of the nozzle row than a gravity center of the second upstream nozzle portion.

15. The liquid discharge head according to claim 14, further comprising:

a third driving element;

a third pressure chamber that is partitioned on the pressure chamber substrate and imparts pressure to liquid by driving the third driving element; and a third nozzle that is one of the plurality of nozzles, is positioned between the first nozzle and the second nozzle in an arrangement direction in which the plurality of nozzles are arranged, and communicates with the third pressure chamber, wherein the third nozzle includes:

a third downstream nozzle portion opened on the discharge surface; and a third upstream nozzle portion of which a cross-sectional area is larger than a cross-sectional area of the third downstream nozzle portion when viewed in the thickness direction and that is positioned upstream of the third downstream nozzle portion, in a case where, when viewed in the thickness direction, a distance between a gravity center position of the third downstream nozzle portion and a gravity center position of the third upstream nozzle portion is set as a third distance, and the third distance is longer than the first distance and shorter than the second distance.

16. The liquid discharge head according to claim 15, wherein the first nozzle is positioned next to the third nozzle, the second nozzle is positioned next to the third nozzle and is positioned in a direction opposite to a direction from the third nozzle to the first nozzle, and in a case where, when viewed in the thickness direction, a distance between the gravity center position of the third downstream nozzle portion and the gravity center position of the first downstream nozzle portion is set as a fourth distance, a distance between the gravity center position of the third downstream nozzle portion and the gravity center position of the second downstream nozzle portion is set as a fifth distance, a distance between the gravity center position of the third upstream nozzle portion and the gravity center position of the first upstream nozzle portion is set as a sixth distance, and a distance between the gravity center position of the third upstream nozzle portion and the gravity center position of the second upstream nozzle portion is set as a seventh distance, and an absolute value of a difference between the fourth distance and the fifth distance is smaller than an absolute value of a difference between the sixth distance and the seventh distance.

* * * * *